(12) United States Patent
Biran et al.

(10) Patent No.: US 7,320,041 B2
(45) Date of Patent: Jan. 15, 2008

(54) CONTROLLING FLOW OF DATA BETWEEN DATA PROCESSING SYSTEMS VIA A MEMORY

(75) Inventors: Giora Biran, Zichron Ya'akov (IL); Tal Sostheim, Kiryat Tivon (IL)

(73) Assignee: International Business Machines Corporation, Armonk, NY (US)

( * ) Notice: Subject to any disclaimer, the term of this patent is extended or adjusted under 35 U.S.C. 154(b) by 184 days.

(21) Appl. No.: 10/619,988

(22) Filed: Jul. 15, 2003

(65) Prior Publication Data

US 2004/0057380 A1     Mar. 25, 2004

(51) Int. Cl.
*G06F 3/00*     (2006.01)

(52) U.S. Cl. .................... 710/29; 710/6; 710/7; 710/16; 710/17; 710/18; 710/19; 710/21

(58) Field of Classification Search .................... 710/6, 710/7, 16, 17, 18, 19, 21, 29
See application file for complete search history.

(56) References Cited

U.S. PATENT DOCUMENTS

| | | | | |
|---|---|---|---|---|
| 5,448,702 A | * | 9/1995 | Garcia et al. ................ | 710/100 |
| 5,905,729 A | * | 5/1999 | Gaddis et al. ............... | 370/399 |
| 6,028,843 A | | 2/2000 | Delp et al. | |
| 6,202,107 B1 | * | 3/2001 | Collier ........................ | 710/22 |
| 6,226,267 B1 | * | 5/2001 | Spinney et al. .............. | 370/235 |
| 6,324,595 B1 | * | 11/2001 | Tsai et al. ..................... | 710/15 |
| 6,324,597 B2 | * | 11/2001 | Collier ......................... | 710/22 |
| 6,466,581 B1 | * | 10/2002 | Yee et al. .................... | 370/428 |
| 6,522,188 B1 | * | 2/2003 | Poole .......................... | 327/407 |
| 6,697,330 B1 | * | 2/2004 | Melvin et al. ............... | 370/235 |
| 6,832,273 B2 | * | 12/2004 | Ray et al. ..................... | 710/42 |
| 2002/0083341 A1 | * | 6/2002 | Feuerstein et al. .......... | 713/201 |

FOREIGN PATENT DOCUMENTS

| | | | |
|---|---|---|---|
| EP | 175398 A | * | 3/1986 |
| JP | 08-214004 | | 8/1996 |
| JP | 2000-194655 | | 7/2000 |
| JP | 2000-244521 | | 9/2000 |
| JP | 2000-295281 | | 10/2000 |
| JP | 2004-523035 | | 7/2004 |
| WO | WO 9815898 A | | 4/1998 |
| WO | WO 02061592 | | 8/2002 |
| WO | WO02061592 A1 | | 8/2002 |

* cited by examiner

*Primary Examiner*—Alan S. Chen
(74) *Attorney, Agent, or Firm*—Louis P. Herzberg

(57) ABSTRACT

Apparatus, methods and systems for controlling data flow between data processing systems. In an example embodiment, the apparatus includes descriptor logic for generating a plurality of descriptors including a frame descriptor defining a data packet to be communicated between a location in the memory and a data processing system, and a pointer descriptor identifying the location in the memory. The apparatus also includes a descriptor table for storing descriptors generated by the descriptor logic for access by the data processing systems.

21 Claims, 12 Drawing Sheets

CONTROLLING FLOW OF DATA BETWEEN DATA PROCESSING SYSTEMS VIA A MEMORY

CROSS REFERENCE

This application is cross referenced with Ser. No. 10/619,960 having the same title and being filed on the same day. The cross referenced docket is here included by reference in entirety for all purposes.

FIELD OF INVENTION

The present invention relates to a method and apparatus for controlling flow of data via a memory between first and second data processing systems such as a host computer system and a data communications interface for communicating data between the host computer system and a data communications network.

BACKGROUND OF THE INVENTION

A conventional data processing network comprises a plurality of host computer systems and a plurality of attached devices all interconnected by an intervening network architecture such as an Ethernet architecture. The network architecture typically comprises one or more data communications switches. The host computer systems and the attached devices each form a node in the data processing network. Each host computer system typically comprises a plurality of central processing units and data storage memory device interconnected by a bus architecture such as a PCI bus architecture. A network adapter is also connected to the bus architecture for communicating data between the host computer system and other nodes in the data processing network via the network architecture. It would be desirable for transfer of data and control information between the host computer system and the network architecture to be facilitated as efficiently as possible.

SUMMARY OF THE INVENTION

In one aspect of the present invention, there is now provided apparatus for controlling flow of data between first and second data processing systems via a memory, the apparatus comprising descriptor logic for generating a plurality of descriptors including a frame descriptor defining a data packet to be communicated between a location in the memory and the second data processing system, and a pointer descriptor identifying the location in the memory; and a descriptor table for storing the descriptors generated by the descriptor logic for access by the first and second data processing systems. The descriptor logic and descriptor table improve efficiency of data flow control between the first and second data processing systems such as a host computer system and a data communications interface for communicating data between the host computer system and a data communications network. The descriptor table may be stored in the memory of the host computer system. Alternatively, the descriptor table is stored in a memory of the data communications interface. The descriptor logic may also generate a branch descriptor comprising a link to another descriptor in the descriptor table. The descriptor table may comprises a plurality of descriptor lists sequentially linked together via branch descriptors therein. Alternatively, the descriptor table may comprise a cyclic descriptor list.

Another aspect of the present invention extends to a data processing system extends to a data processing system comprising a host processing system having a memory, a data communications interface for communicating data between the host computer system and a data communications network, and apparatus as hereinbefore described for controlling flow of data between the memory of the host computer system and the data communications interface Viewing the present invention from another aspect, there is now provided a method for controlling flow of data between first and second data processing systems via a memory, the method comprising: by descriptor logic, generating a plurality of descriptors including a frame descriptor defining a data packet to be communicated between a location in the memory and the second data processing system, and a pointer descriptor identifying the location in the memory; and storing the descriptors generated by the descriptor logic in a descriptor table for access by the first and second data processing systems.

BRIEF DESCRIPTION OF THE DRAWINGS

These and other objects, features, and advantages of the present invention will become apparent upon further consideration of the following detailed description of the invention, by way of example only, when read in conjunction with the drawing figures, in which.

DESCRIPTION OF THE INVENTION

The present invention provides methods, systems and apparatus for controlling flow of data between first and second data processing systems via a memory, the apparatus comprising descriptor logic for generating a plurality of descriptors including a frame descriptor defining a data packet to be communicated between a location in the memory and the second data processing system, and a pointer descriptor identifying the location in the memory;

and a descriptor table for storing the descriptors generated by the descriptor logic for access by the first and second data processing systems. The descriptor logic and descriptor table improve efficiency of data flow control between the first and second data processing systems such as a host computer system and a data communications interface for communicating data between the host computer system and a data communications network. The descriptor table may be stored in the memory of the host computer system. Alternatively, the descriptor table is stored in a memory of the data communications interface. The descriptor logic may also generate a branch descriptor comprising a link to another descriptor in the descriptor table. The descriptor table may comprises a plurality of descriptor lists sequentially linked together via branch descriptors therein. Alternatively, the descriptor table may comprise a cyclic descriptor list.

In more particular embodiments, the present invention extends to a data processing system comprising a host processing system having a memory, a data communications interface for communicating data between the host computer system and a data communications network, and apparatus as hereinbefore described for controlling flow of data between the memory of the host computer system and the data communications interface There is now also provided a method for controlling flow of data between first and second data processing systems via a memory, the method comprising: by descriptor logic, generating a plurality of descriptors including a frame descriptor defining a data packet to be communicated between a location in the memory and the second data processing system, and a pointer descriptor identifying the location in the memory; and storing the descriptors generated by the descriptor logic in a descriptor table for access by the first and second data processing systems.

Figure 1:
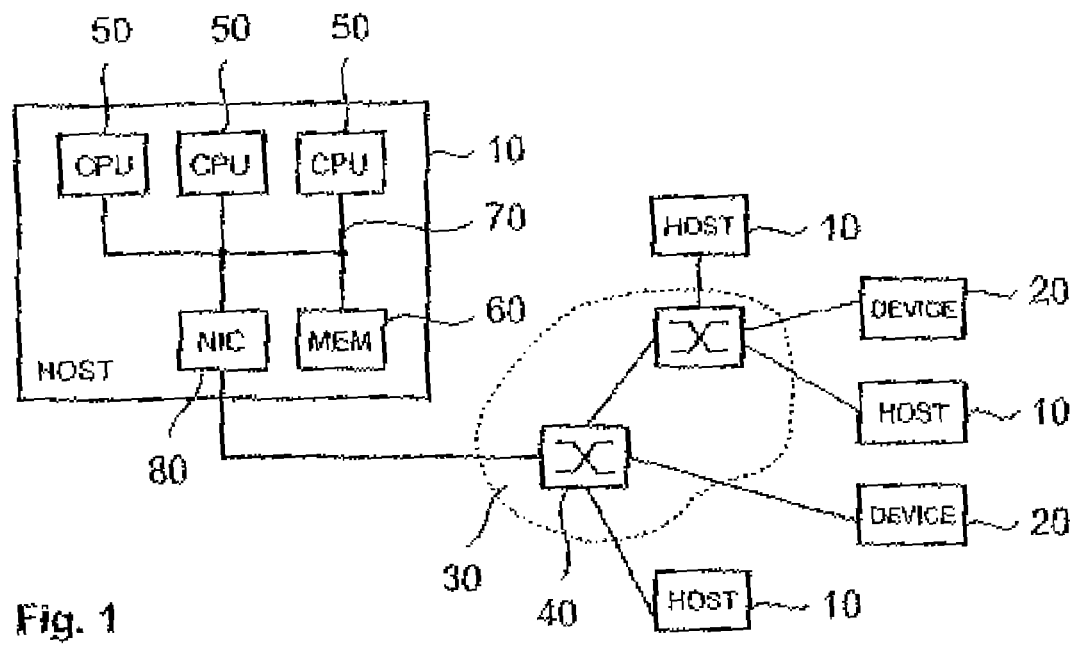
FIG. 1 is a block diagram of an example of a data processing network.

Referring first to FIG. 1, an example of a data processing network embodying the present invention comprises a plurality of host computer systems 10 and a plurality of attached devices 20 interconnected by an intervening network architecture 30 such as an InfiniBand network architecture (InfiniBand is a trade mark of the InfiniBand Trade Association). The network architecture 30 typically comprises a plurality of data communications switches 40. The host computer systems 10 and the attached devices 20 each form a node in the data processing network. Each host computer system 10 comprises a plurality of central processing units (CPUs) 50, and a memory 60 interconnected by a bus architecture 70 such as a PCI bus architecture. A network adapter 80 is also connected to the bus architecture for communicating data between the host computer system 10 and other nodes in the data processing network via the network architecture 30.

Figure 2:
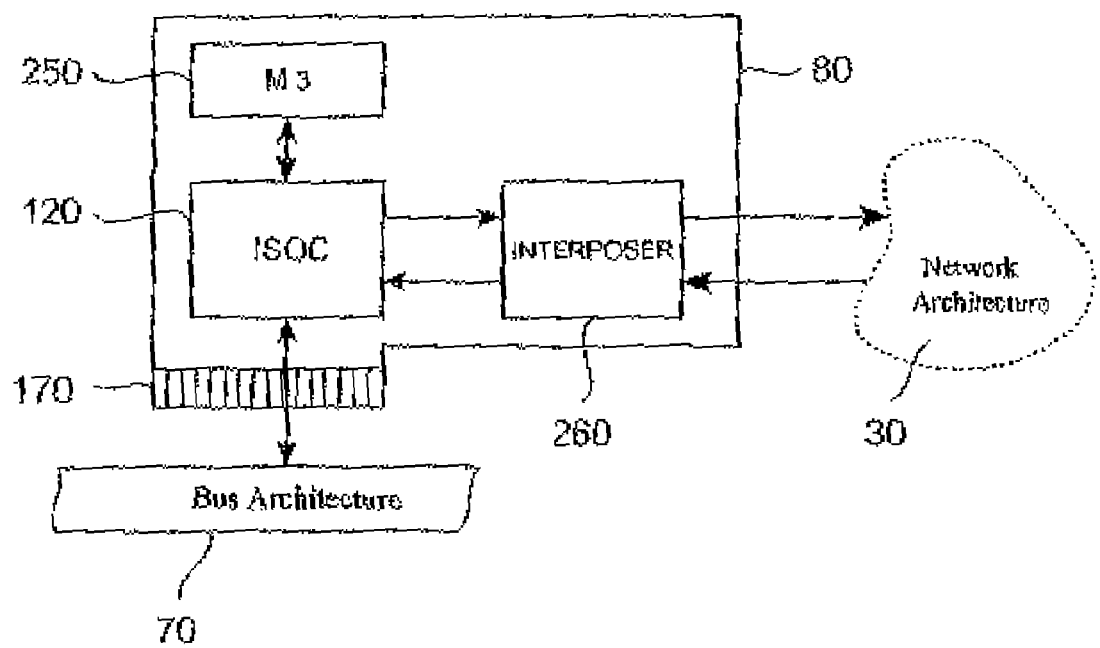
FIG. 2 is a block diagram of a network interface adapter card for the data processing network.

Referring now to FIG. 2, in particularly preferred embodiments of the present invention, the network adapter 80 comprises a pluggable option card having a connector such as an edge connector for removable insertion into the bus architecture 70 of the host computer system 10. The option card carries an Application Specific Integrated Circuit (ASIC) or Integrated System on a Chip (ISOC) 120 connectable to the bus architecture 70 via the connector 170, one or more third level memory modules 250 connected to the ISOC 120, and an interposeer 260 connected to the ISOC 120 for communicating data between the media of the network architecture 30 and the ISOC 120. The interposer 260 provides a physical connection to the network 30. In some embodiments of the present invention, the interposer 260 may be implemented in a single ASIC. However, in other embodiments of the present invention, the interposer 260 may be implemented by multiple components.

For example, if the network 30 comprises an optical network, the interposer 260 may comprise a retimer driving a separate optical transceiver. The memory 250 may be implemented by SRAM, SDRAM, or a combination thereof. Other forms of memory may also be employed in the implementation of memory 250. The ISOC 120 includes a first and a second memory. The memory subsystem of the adapter 80 will be described shortly. As will become apparent from the following description, this arrangement provides: improved performance of distributed applications operating on the data processing network; improved system scaleability; compatibility with a range of communication protocols; and reduced processing requirements in the host computer system. More specifically, this arrangement permits coexistence of heterogeneous communication protocols between the adapters 80 and the host systems 10. Such protocols can serve various applications, use the same adapter 80, and use a predefined set of data structures thereby enhancing data transfers between the host and the adapter 80. The number of application channels that can be opened in parallel is determined by the amount of memory resources allocated to the adapter 80 and is independent of processing power embedded in the adapter. It will be appreciated from the following that the ISOC 120 concept of integrating multiple components into a single integrated circuit chip component advantageously minimizes manufacturing costs and in provides reusable system building blocks. However, it will also be appreciated that in other embodiments of the present invention, the elements of the ISOC 120 may be implemented by discrete components.

In the following description, the term Frame refers to data units or messages transferred between software running on the host computer system 10 and the adapter 80. Each Frame comprises a Frame Header and a data payload. The data payload may contain user data, high level protocol header data, acknowledgments, flow control or any combination thereof. The contents of the Frame Header will be described in detail shortly. The adapter 80 processes only the Frame Header. The adapter 80 may fragment Frames into smaller packets which are more efficiently transported on the network architecture 30. However, such fragmentation generally does not transform the data payload.

In particularly preferred embodiment of the present invention, data is transported on the network architecture 30 in atomic units hereinafter referred to as Packets. Each Packet comprises route information followed by hardware header data and payload data. In a typical example of the present invention, a packet size of up to 1024 bytes is employed. Frames of larger size are fragmented into 1024 byte packets. It will be appreciated that in other embodiments of the present invention, different packet sizes may be employed.

In a preferred embodiment of the present invention, communications between the adapter 80 and multiple applications running on the host computer system 10 are effected via a Logical Communication Port architecture (LCP). The adapter 80 comprises a memory hierarchy which allows optimization of access latency to different internal data structures. This memory hierarchy will be described shortly. In preferred embodiments of the present invention, the adapter 80 provides separate paths for outbound (TX) data destined for the network architecture 30 and inbound (RX) data destined for the host computer system 10. Each path includes it own data transfer engine, header processing logic and network architecture interface. These paths will alas be described in detail shortly.

Figure 3:
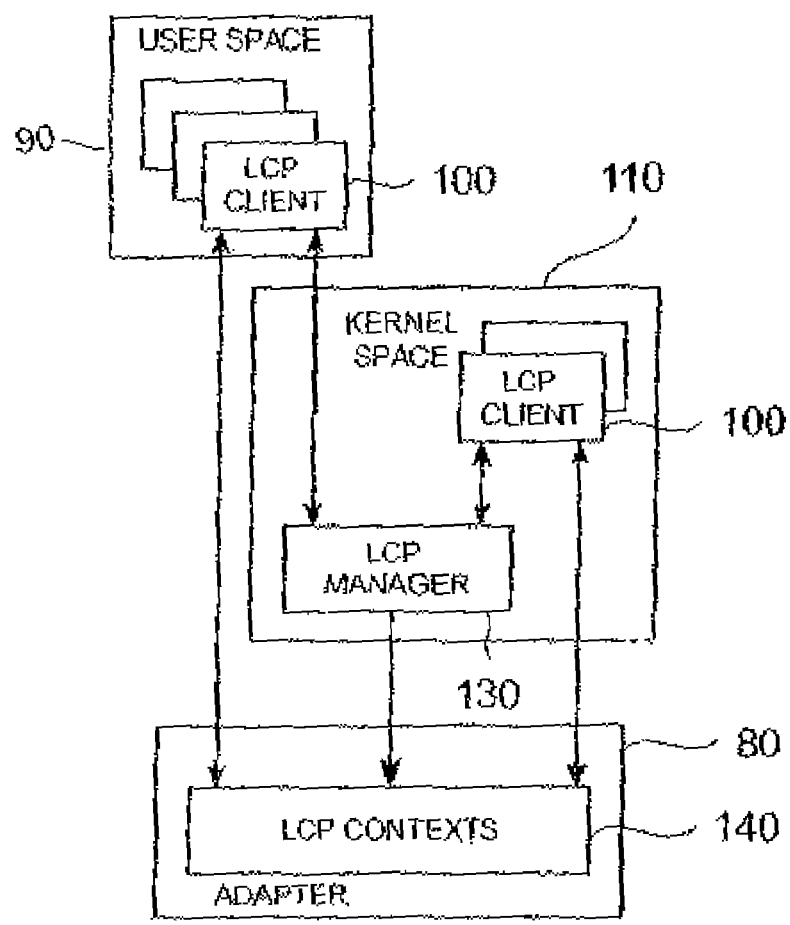
FIG. 3 is a block diagram of an example of a host computer system for the data network.
Figure 4:
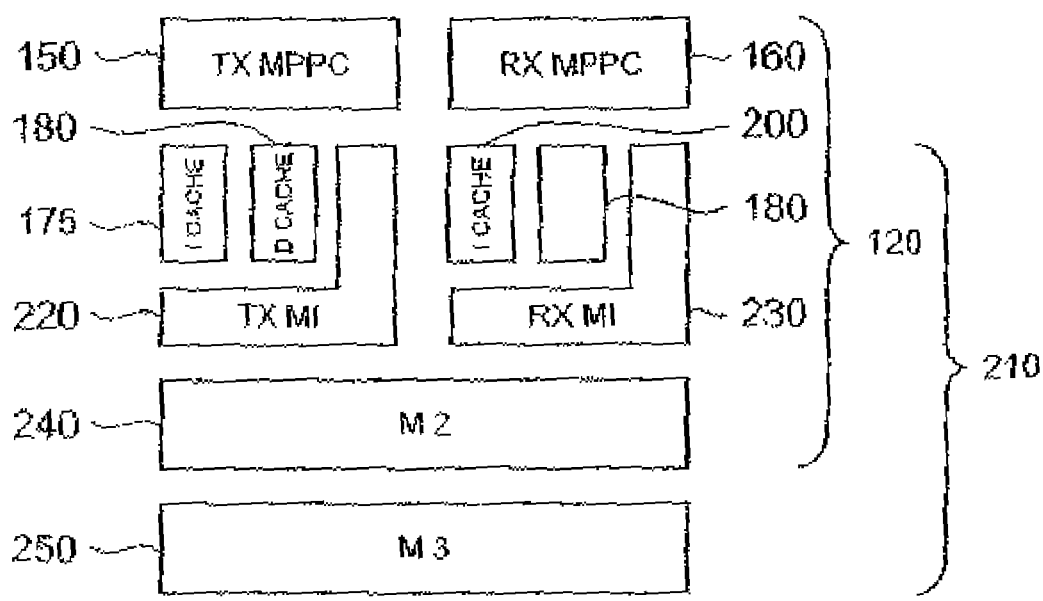
FIG. 4 is a block diagram of an example of an Integrated System on a Chip (ISOC) for the network adapter card.

Referring now to FIG. 3, the LCP architecture defines a framework for the interface between local consumers running on the host computer system 10 and the adapter 80. Examples of such consumers include both applications and threads. The computer system 10 can be subdivided into a user application space 90 and a kernel space 110. The LCP architecture provides each consumer with a logical port into the network architecture 30. This port can be accessed directly from a user space 90. In particularly preferred embodiments of the present invention, a hardware protection mechanism takes care of access permission. An LCP registration is performed by in the kernel space 110 prior to transfer of data frames. The LCP architecture need not define a communication protocol. Rather, it defines an interface between the applications and the adapter 80 for transfer of data and control information. Communication protocol details may be instead set by the application and program code executing in the adapter 80. The number of channels that can be used on the adapter 80 is limited only by the amount of memory on the adapter card 80 available for LCP related information. Each LCP port can be programmable to have a specific set of features. The set of features is selected according to the specific protocol to best support data transfer between the memory 60 in the host computer system and the adapter 80. Various communication protocols can be supported simultaneously, with each protocol using a different LCP port.

The LCP architecture comprises LCP Clients 100, an LCP Manager 130 resident in the kernel space 130, and one or more LCP Contexts 140 resident in the adapter 80.

Each LCP Client 100 is a unidirectional application end point connected to an LCP port. An LCP client 100 can be located in the user application space 90 or in the kernel 110. In operation, each LCP client 100 produces commands and data to be read from the memory 60 and transferred by the adapter 80 via a TX LCP channel, or consumes data transferred by the adapter 80 to the memory 60 via an RX LCP channel.

The LCP Manager 130 is a trusted component that services request for LCP channel allocations and deallocations and for registration of read/write areas in the memory 60 for each channel. The LCP Manager 130 allows a user space application to use resources of the adapter 80 without compromising other communication operations, applications, or the operating system of the host computer system 10.

Each LCP Context 140 is the set of control information required by the adapter 80 to service a specific LCP Client 100. The LCP Context 140 may include LCP channel attributes which are constant throughout existence of the channel, such as possible commands, pointer structure, and buffer descriptor definitions. The LCP Context 140 may also include specific LCP service information for the LCP channel, such as the amount of data waiting for service, and the next address to access for the related LCP channel. The LCP context 140 is stored in memory resident in the adapter 80 to enable fast LCP context switching when the adapter 80 stops servicing one channel and starts servicing another channel.

An LCP Client 100 requiring initiation of an LCP port turns to the LCP Manager 130 and requests the allocation of an LCP channel. The LCP channel attributes are determined at this time and prescribe the behavior of the LCP port and the operations that the LCP Client 100 is authorized to perform in association with the LCP port. The LCP Client 100 is granted an address that will be used to access the adapter 80 in a unique and secure way. This address is known as a Doorbell Address.

The LCP Manager 130 is also responsible for registering areas of the host memory 60 to enable virtual to physical address translation by the adapter, and to allow user space clients to access these host memory areas without tampering with other programs.

Registration of new buffers and deregistration of previous buffers can be requested by each LCP Client 100 during run-time. Such a change, requires a sequence of information exchanges between the LCP Client 100, the LCP Manager 130, and the adapter 80.

Each LCP Client 100 and port are associated with an LCP Context 140 that provides all the information required by the adapter 80 to service pending requests sent by the LCP port for command execution.

To initiate memory transfers between the LCP Client 100 and the adapter 80, and initiate transmission of frames, the LCP Client 100 prepares descriptors holding the information for a specific operation. The LCP Client 100 then performs an I/O write to the Doorbell address mapped to the adapter 80. Writing to the Doorbell address updates the LCP Context 140 on the adapter 80, adding the new request for execution. The adapter 80 arbitrates between various transmit LCP ports that have pending requests, and selects the next one to be serviced.

On receipt of data, the Frame and LCP for a received packet are identified. Descriptors are generated to define the operation required for the receive LCP. Execution of these descriptors by an LCP Engine of the adapter 80 stores the incoming data in an appropriate data buffer allocated to the LCP channel in the memory 60 of the host computer system 10. For each LCP channel serviced, the adapter 80 loads the associated LCP context information and uses this information to perform the desired set of data transfers. The adapter 80 then continues on to process the next selected LCP Context 140.

Referring now to FIG. 3, and as mentioned earlier, the ISOC 120 comprises a first memory space 220 and 230 and a second memory space 240 and the adapter 80 further comprises a third level memory 250. The first, second, and third memory spaces for part of a memory subsystem 210 of the adapter 80. In a preferred embodiment of the present invention, the ISOC 120 comprises a TX processor (TX MPC) 150 dedicated to data transmission operations and an RX processor (RX MPC) 160 dedicated to data reception operation. In particularly preferred embodiments of the present invention, processors 150 and 160 are implemented by Reduced Instruction Set Computing (RISC) microprocessors such as IBM PowerPC 405 RISC microprocessors. Within the memory subsystem 210, the ISOC 120 comprises, in addition to the first and second memory spaces, a data cache 180 and an instruction cache 175 associated with TX processor 150, together with a second data cache 190 and second instruction cache 190 associated with RX processor 160. The difference between the three levels is the size of memory and the associated access time. As will become apparent shortly, the memory subsystem 210 facilitates: convenient access to instruction and data by both the TX processor 150 and the RX processor 160; scaleability; and sharing of resources between the TX processor 150 and the RX processor 160 in the interests of reducing manufacturing costs.

The first level memory spaces (M1) 220 and 230 comprise a TX-M1 memory space 220 and RX-M1 memory space 230. The TX-M1 memory 220 can be accessed only by the TX processor 150 and the RX-M1 memory 230 can be accessed only by the RX processor 160. In operation the first level memory spaces 220 and 230 are used to hold temporary data structures, header templates, stacks, etc. The first level memory spaces 220 and 230 both react to zero wait states. Each one of the first level memory spaces 220 and 230 is connected only to the data interface of the corresponding one of the processors 150 and 160 and not to the instruction interface. This arrangement enables both cacheable and non-cacheable first level memory areas available while maintaining efficient access to data in the first level memory spaces 230 and 240.

The second level memory space (M2) 240 is a shared memory available to both processors 150 and 160, other components of the adapter 80, and to the host computer system 10. Access to the second level memory space 240 is slower than access to the first level memory areas 220 and 230 because the second level memory space 240 is used by more agent via a shared internal bus. The third level memory space 250 is also a shared resource. In particularly preferred embodiments of the present invention the adapter 80 comprises a computer peripheral circuit card on which the first level memory spaces 220 and 230 and the second level memory space 240 are both integrated on the same ASIC as the processors 150 and 160. The shared memory spaces 240 and 250 are generally used for data types that do not require fast and frequent access cycles. Such data types include LCP contexts 140 and virtual address translation tables. The shared memory spaces 240 and 250 are accessible to both instruction and data interfaces of the processors 150 and 160.

Figure 5:
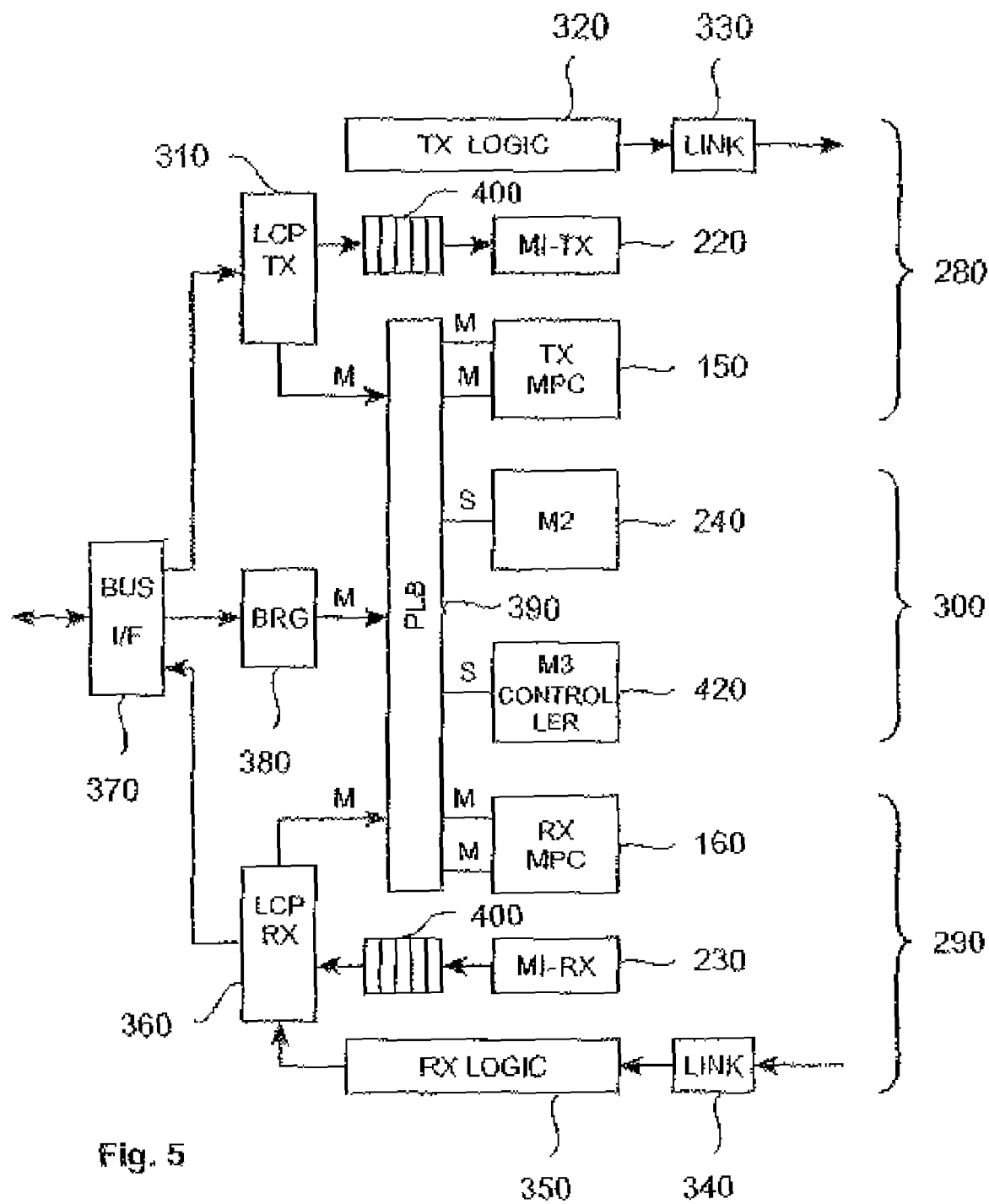
FIG. 5 is another block diagram of the ISOC.

The adapter 80 handles transmission and reception data flows separately. The separate processor 150 and 160 for the transmission and reception path avoids the overhead of switching between task, isolates temporary processing loads in one path from the other path, and facilitates use of two embedded processors to process incoming and outgoing data streams. Referring now to FIG. 5, the ISOC 120 comprises transmission path logic 280 and reception path logic 290, and shared logic 300. The transmission path logic 280 comprises an LCP TX engine 310 for decoding specifics of each LCP channel and fetching LCP related commands for execution; TX logic 320 for controlling transfer of frames into the adapter 80, the aforementioned TX processor 150 for managing TX frame and packet processing; the aforementioned first level TX memory 220 for holding instructions and temporary data structures; and link logic 330; and logic for assisting the TX processor 150 in managing the data flow and packet processing such as routing processing for fragmentation of frames into data packets. The TX processor 150 processes tasks in series based on a polling only scheme in which the processor is interrupted only on exceptions and errors. The first level TX memory 220 is employed by the processor 150 for communicating with TX logic 320. The reception path logic 290 comprises link logic 340; hardware for assisting the aforementioned RX processor 160 in processing headers of incoming packets and transformation or assembly of such packets into frames; the aforementioned RX processor 160 for RX frame and packet processing; the aforementioned first level RX memory 230 for holding instructions; RX logic 350 for controlling transfer of frames from the network architecture 30; and an LCP RX engine 360 for decoding the specifics of each LCP channel, storing the incoming data in the related LCP data structures in the memory 60 of the host computer system, and accepting and registering pointers to empty frame buffers as they are provided by the LCP Client 100 for use by the adapter 80. The RX processor 160 processes tasks in series using a polling only scheme in which the RX processor 160 is interrupted only on exceptions or errors. The level 1 RX memory 230 is used by the RX processor 160 to communicate with the RX logic 350.

As mentioned earlier, the ISOC approach permits reduction in manufacturing costs associated with the adapter 80 and the other components thereof, such as the circuit board and the other supporting modules. The ISOC approach also increases simplicity of the adapter 80, thereby increasing reliability. The number of connections between elements of the ISOC 120 is effectively unlimited. Therefore, multiple and wide interconnect paths can be implemented. In the interests of reducing data processing overheads in the host computer system 10, data transfer operations to and from the host memory 60 are predominantly performed by the ISOC 120. The ISOC 120 also performs processing of the header of incoming and outgoing packets. During transmission, the ISOC 120 builds the header and routes it to the network architecture 30. During reception, the adapter 80 processes the header in order to determine its location in the system's memory. The level 1 memories 220 and 230 are zero wait state memories providing processor data space such as stack, templates, tables, and temporary storage locations. In especially preferred embodiments of the present invention, the transmission path logic 280, reception path logic 290, and shared logic 300 are built from smaller logic elements referred to as cores. The term core is used because there elements are designed as individual pieces of logic which have stand-alone properties enabling them to be used for different applications.

As indicated earlier, the transmission path logic 280 is responsible for processing transmission or outgoing frames. Frame transmission is initiated via the bus architecture 70 by a CPU such as CPU 50 of the host computer system 10. The ISOC 120 comprises bus interface logic 370 for communicating with the bus architecture 70. The ISOC 120 also comprises bus bridging logic 390 connecting the bus interface logic 370 to a processor local bus (PLB) 390 of the ISOC 120. The TX LCP engine 310 fetches commands and frames from the host memory 60. The TX processor 150 processes the header of each frame into a format suitable for transmission as packets on the network architecture 30. The TX logic 320 transfer the frame data without modification. The link logic 330 processes each packet to be transmitted into a final form for transmission on the network architecture 30. The link logic 330 may comprises one or more ports each connectable to the network architecture 30.

As indicated earlier, the reception path logic 290 is responsible for processing incoming packets. Initially, packets received from the network architecture 30 are processed by link logic 340. Link logic 340 recreates the packet in a header and payload format. To determine the packet format and its destination in the host memory 60, the header is processing by the RX processor 230. The link logic 340 may comprises one or more ports each connectable to the network architecture 30. The RX LCP engine is responsible for transferring the data into the host memory 60 via the bus architecture 70.

The transmission path logic 280 comprises a HeaderIn first in—first out memory (FIFO) 400 between the TX LCP engine 310 and the TX processor 220. The reception path logic comprises a HeaderOut FIFO 410 between the RX processor 230 and the RX LCP engine 360. Additional FIFOs and queues are provided in the TX logic 320 and the RX logic 350. These FIFOs and queues will be described shortly.

The shared logic 300 comprises all logical elements shared by the transmission path logic 280 and the reception path logic 290. These elements include the aforementioned bus interface logic 370, bus bridging logic 380, PLB 390, second level memory 240 and a controller 420 for providing access to the remote third level memory 250. The bus interface logic 370 operates as both master and slave on the bus architecture 70. As a slave, the bus interface logic allows the CPU 50 to access the second level memory 240, the third level memory 250 via the controller 420, and also configuration registers and status registers of the ISOC 120. Such registers can generally be accessed by the CPU 50, the TX processor 150 and the RX processor 160. As a master, the bus interface logic allows the TX LCP engine 310 and the RX LCP engine 360 to access the memory 60 of the host computer system 10. In FIG. 5, "M" denotes a master connection and "S" denotes a slave connection.

Figure 6:
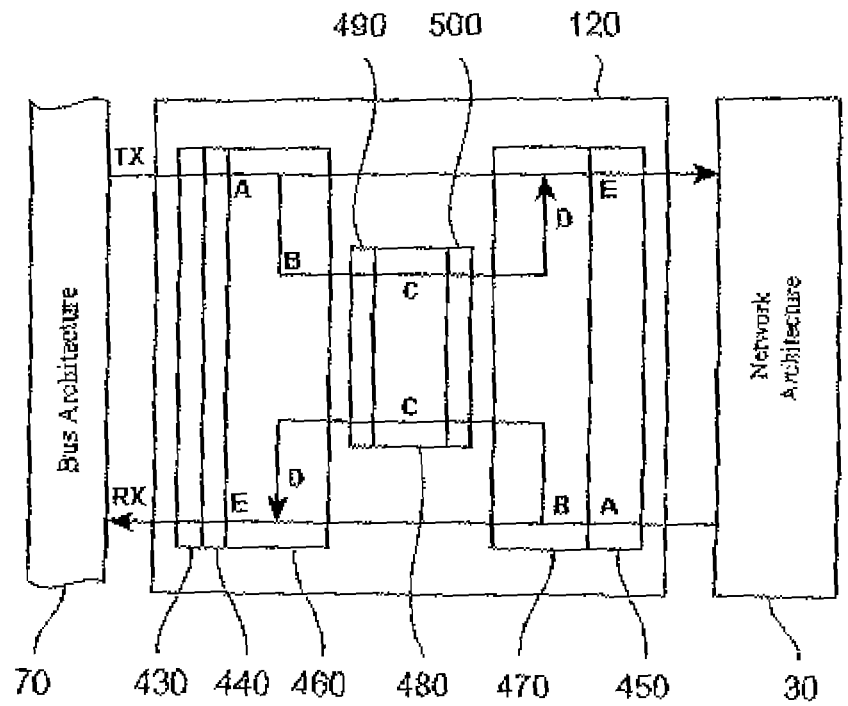
FIG. 6 is a block diagram of the ISOC demonstrating information flow through the ISOC.

Referring now to FIG. 6, packet flow through the ISOC 120 is generally symmetrical. In other words, the general structure of flow is similar in both transmit and receive directions. The ISOC 120 can be regarded as comprising first interface logic 440; a first control logic 460; processor logic 480; second control logic 470; and second interface logic 450. Packets are processed in the following manner:

A. In the transmit direction, information is brought into the ISOC 120 from the bus architecture 70 through the first interface logic. In the receive direction, information is brought into the ISOC 120 from the network architecture 30 through the second interface logic 450.

B. In the transmit direction, information brought into the ISOC 120 through the first interface logic 440 is processed by the first control logic 460. In the receive direction, information brought into the ISOC through the second interface logic 450 is processed by the second control logic 470.

C. In the transmit direction, a frame header is extracted for an outgoing frame at the first control logic 460 and processed by the processor logic 480. The processor logic 480 generates instructions for the second control logic 470 based on the frame header. The payload of the outgoing frame is passed to the second interface logic 470. In the receive direction, a frame header is extracted from an incoming frame at the second control logic 470 and processed by the processor logic 480. The processor logic 480 generates instructions for the first control logic 460 based on the frame header. The payload of the incoming frame is passed to the first control logic 460. In both directions, the processor 480 is not directly handling payload data.

D. In the transmit direction, the second control logic 470 packages the outgoing payload data according to the instructions received from the processor logic 480. In the receive direction, the first control logic 460 packages the incoming payload according to the instructions received from the processor logic 480.

E. In the transmit direction, the information is moved through the second interface logic 450 to its destination via the network architecture 30. In the receive direction, the information is moved through the first interface logic to its destination via the bus architecture 70.

An interface to software operating on the host computer system 10 is shown at 430. Similarly, interfaces to microcode operating on the processor inputs and outputs is shown at 490 and 500.

Figure 7:
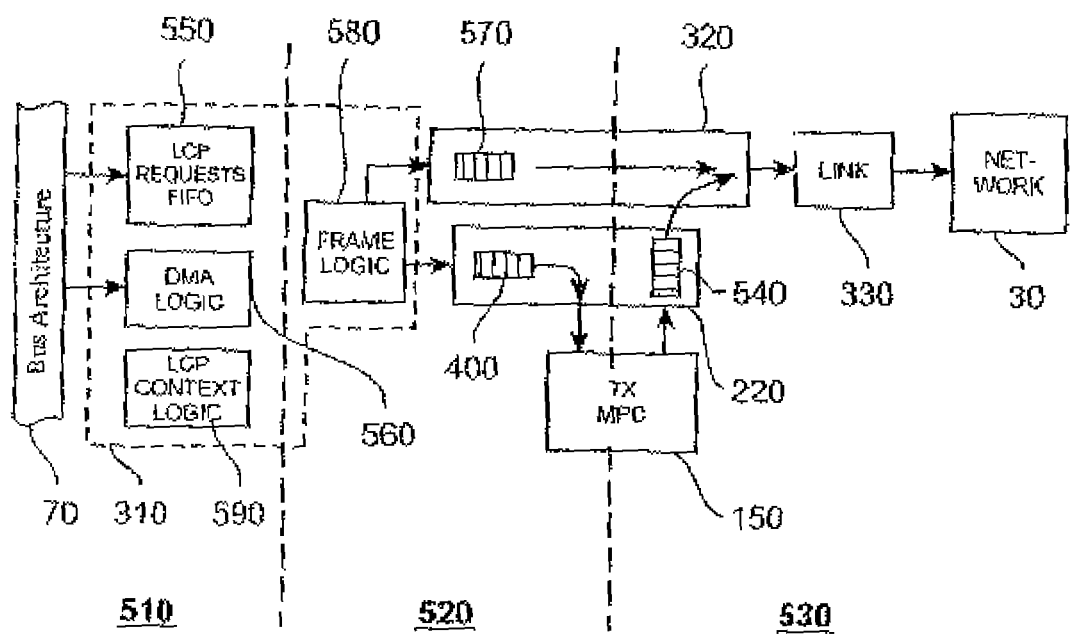
FIG. 7 is a block diagram of a logical transmit path through the ISOC.

Referring to FIG. 7, what follows now is a more detailed description of one example of a flow of transmit data frames through the ISOC 120. The ISOC 120 can be divided into an LCP context domain 510, a frame domain 520 and a network domain 530 based on the various formats of information within the ISOC 120. The TX LCP engine 310 comprises an LCP requests FIFO 550, Direct Memory Access (DMA) logic 560, frame logic 580, and the aforementioned LCP context logic 140. The LCP request FIFO 550, DMA logic 560, and LCP TX Context logic 590 reside in the LCP context domain 510. The frame logic 580 resides in the frame domain 520. The TX logic 320, first level TX memory space 220, and TX processor 150 straddle the boundary between the frame domain 520 and the network domain 530. The TX link logic 330 resides in the network domain 530. In particularly preferred embodiments of the present invention, the HeaderIn FIFO 400 is integral to the first level TX memory space 220. In general, an application executing on the host computer system 10 creates a frame. The frame is then transmitted using a TX LCP channel on the adapter 80. Handshaking between the application and the adapter 80 assumes a prior initialization performed by the LCP Manager 130. To add an LCP Service Request, an LCP Client 100 informs the adapter 80 that one or more additional transmit frames are ready to be executed. This is performed by writing to a control word in to a Doorbell. The Doorbell's addresses are allocated in such as way that the write operation is translated into a physical write cycle on the bus architecture 70, using an address that is uniquely associated with the LCP port and protected from access by other processes. The adapter 80 detects the write operation and logs the new request by incrementing an entry of previous requests for the specific LCP Client 100. This is part of the related LCP Context 140. An arbitration list, retained in the memory subsystem 210 of the adapter 80 is also updated. In a simple example, arbitration uses the aforementioned FIFO scheme 550 between all transmit LCP channels having pending requests. While one LCP channel is serviced, the next LCP channel is selected. The service cycle begins when the corresponding LCP Context is loaded into the TX LCP engine 310. The LCP Context 140 is then accessed to derive atomic operations for servicing the LCP channel and to determine parameters for such operations. For example, such atomic operations may be based on LCP channel attributes recorded in the LCP Context 140. A complete service cycle typically includes a set of activities performed by the adapter 80 to fetch and execute a plurality of atomic descriptors created by the LCP Client 100. In the case of a TX LCP channel, the service cycle generally includes reading multiple frames from the host memory 60 into the memory subsystem 210 of the adapter 80. Upon conclusion, all the LCP Context information requiring modification (in other words, the LCP Service Information) is updated in the memory subsystem 210 of the adapter 80. In general, the first action performed by the adapter 80 within the LCP Service cycle, is to fetch the next descriptor to be processed.

Processing of transmission frames by the ISOC 120 typically includes the following steps:

A. Fetching the subsequent LCP port frame descriptor.
   The address of the next descriptor to be fetched is stored as parts of the LCP channel's Context 140. The adapter 80 reads the descriptor from host memory 60 and decodes the descriptor based on the LCP channel attributes. The descriptor defines the size of the new frame header, the size of the data payload, and the location of these items.

B. Conversion of virtual address to physical address.
   If a data buffer is referenced by virtual memory addresses in an application, the address should go through an additional process of address translation. In this case, the virtual address used by the application is translated into a physical address usable by the adapter 80 while it access the host memory 60. This is done by monitoring page boundary crossings and using physical page location information written by the LCP manager 130 into the memory subsystem 210 of the adapter 80. The virtual to physical translation process serves also as a security measure in cases where a descriptor table is created by an LCP client 100 which is not trusted. This prevents unauthorized access to unrelated areas of the host memory 60.

C. Reading the frame header.

Using physical addressing, the header and payload data of the TX frame are read from buffers in the host memory 60. The header is then stored in the TX HeaderIn FIFO 400. When the header fetch is completed, the adapter 80 sets an internal flag indicating that processing of the header can be initiated by the TX processor 150.

D. Reading the frame data.

The payload data is read from the host memory 60 and stored by the adapter 80 in a data FIFO 570. The data FIFO 570 is shown in FIG. 7 as resident in the TX logic 320. However, the data FIFO 570 may also be integral to the first level TX memory space 220. Data read transactions continue until all data to be transmitted is stored in the memory subsystem 210 of the adapter 80. Following completion of the read operation, a status indication is returned to the LCP Client 100. Note that processing of the header can start as soon as the header has been read into the HeaderIn FIFO 400. There is no need to wait for the whole data to be read.

E. Processing the frame header

The header processing is performed by the TX processor 150. Header processing is protocol dependent and involves protocol information external to the LCP architecture. The TX processor 150 runs TX protocol header microcode and accesses routing tables and other relevant information already stored in the memory subsystem 210 of the adapter 80 during a protocol and routing initialization sequence. When the TX processor 150 receives an indication that a new header is waiting in the HeaderIn FIFO 400, it starts the header processing. The header processing produces one or more packet headers which are in the format employed to send packets over the network architecture 30 and include routing information. If the payload size is larger than a maximum packet size allowed by the network architecture 30, the payload is fragmented by generating several packet headers each used in connection with consecutive data segments of the original payload data to form packets for communication over the network architecture 30.

F. Queuing the packet header for transmission

A command defining the number of header words and the number of data words for a packet and the packet header itself are written by the TX processor 150 to a TX HeaderOut FIFO 540 in the first level memory space 220.

G. Merging packet header and packet data for transmission.

Transmission of a packet on the network architecture 30 is triggered whenever a command is ready in the HeaderOut FIFO 540, and the data FIFO 570 contains enough data to complete the transmission of the related packet. A Cyclic Redundancy Check (CRC) may be added to the header and data of each packet. Each complete packet is transferred to the network architecture 30 via the TX link logic 330.

The transmission process for each frame is completed when all the frame data is transmitted on the network architecture 30, by means of one or more packets. For each frame processed by the adapter 80, a status may be returned to the application via a second LCP Client 100. This status indicates the completion of the frame data transfer from the host memory 60 onto the adapter 80, completion of the frame transmission itself, or other levels of transmission status.

At any instance in time, the adapter 80 may be concurrently executing some or all of the following actions: selecting the next LCP to be serviced; initiating service for LCP channel A; executing DMA fetch of data for the last frame of LCP channel B; processing a frame header and fragmentation for LCP channel C; and, transmitting packets originated by LCP channel D.

Figure 8:
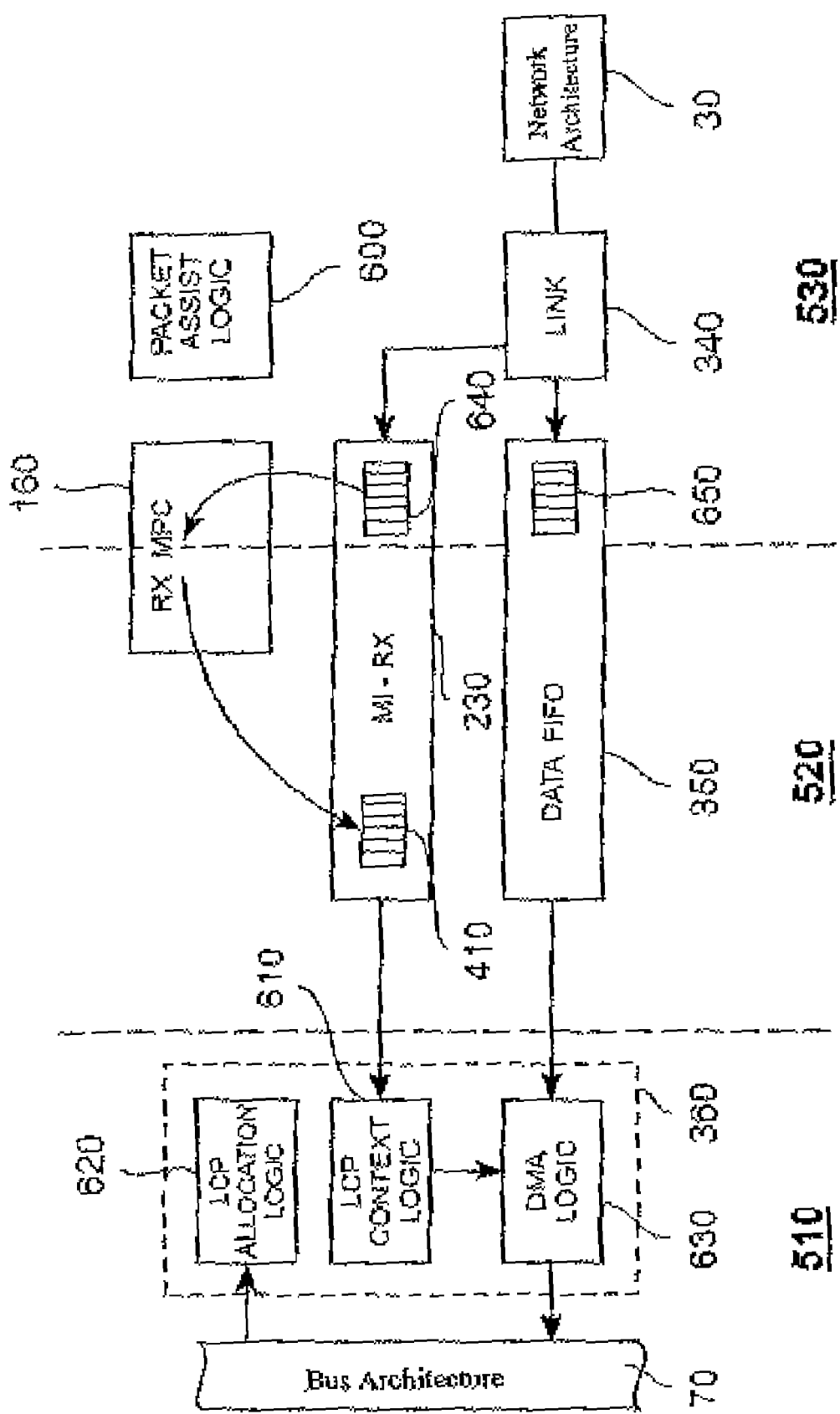
FIG. 8 is a block diagram of a logical receive path through the ISOC.

Referring to FIG. 8, what follows now, by way of example only, is a description of a data frame reception by an application using an RX LCP port. The operation of the ISOC 120 may vary depending on the type of protocol supported by the LCP. Handshaking between the application and the adapter 80 assumes a prior initialization performed by the LCP manager 130. The RX LCP engine 360 comprises LCP allocation logic 620, LCP Context logic 610, and DMA logic 630 all residing in the LCP domain 520. The RX processor 160, first level RX memory space 230, and RX logic 350 all straddle the boundary between the frame domain 520 and the network domain 530. The RX link logic 340 and packet assist logic 600 reside in the network domain 530. In particularly preferred embodiments of the present invention, the HeaderOut FIFO 410 is located in the first level RX memory space 230. Frames received by the ISOC 120 from the network architecture 30 are written into LCP client buffers in the host memory 60. Availability of memory buffers is determined by the LCP RX client 100 and is indicated to the adapter 80 for insertion of incoming data frames. The LCP client 100 provides buffers by writing into a receive Doorbell on the ISOC 120, similar to the aforementioned manner in which the transmission path logic 280 is informed of new frames ready to be transmitted. The Doorbell register address is allocated such that the write operation is translated into a physical write cycle on the bus architecture 70. The adapter 80 detects the write operation and logs the new provision of empty memory areas by incrementing the number of available word entries for the specific LCP RX Client 100. The available word count is part of the related LCP context 140. Whenever an application completes processing of a received frame within a buffer, it writes to the Doorbell. The write cycle indicates the number of words in the newly available memory space. The count within the LCP context is incremented by that amount. A packet received from the network architecture 30 may be part of a larger frame that will be assembled by the adapter 80 into contiguous space in the host memory 60. Processing of received frames by the ISOC 120 generally includes the following steps:

A. Splitting packet header and data

The RX link logic 340 translates information from the network architecture 30 into a stream of packets. Each received packet is processed by the RX link logic 340 to separate the packet header from the payload data. The header is pushed into an RX HeaderIn FIFO 640 in the first level RX memory space 230. The payload is pushed into an RX data FIFO 650 in the RX logic 350. The RX data FIFO 650 may also be implemented in the first level RX memory space 230.

B. Decoding the packet header and generating and LCP frame header.

The packet header is decoded to provide fields indicative of an ID for the frame to which the packet belongs, the size of the payload, and the size of the frame data. Once the packet header is reader for the RX HeaderIn FIFO 640, an indication is sent to the RX processor 160. The RX processor processes the packet header information and generates an LCP related command including information required to transfer the packet data. Such information includes packet address and length. At the end of the header processing, a descriptor, or a set of descriptors, are written to the LCP RX HeaderOut FIFO 410, and an indication is triggered.

C. Transfer of data within the RX LCP Context.

The descriptors are fetched from the RX HeaderOut FIFO 410 by the RX LCP engine 360, and then decoded. The descriptors include the LCP number, packet address, packet data length and the source address of the data to be transferred in the memory subsystem 210 of the adapter 80. The RX LCP engine 340 uses the LCP Context information to create a target physical address (or addresses if a page is crossed) to be written to in the host memory 60 and initiates DMA transfers to write the data.

D. ISOC DMA transactions.

The ISOC 120 aims to optimize transactions on the bus architecture 70 by selecting appropriate bus commands and performing longest possible bursts.

At any instance in time, the adapter 80 may be concurrently executing some or all of the following: processing a buffer allocation for LCP channel X; initiating an inbound data write service for LCP channel A; executing a DMA store of data for LCP channel B; processing a frame assembly of a packet destined for LCP channel C; and, receiving packets for LCP channel D.

To minimize frame processing overhead on the RX processor 160 and TX processor 150, packet assist logic 600 comprises frame fragmentation logic, CRC and checksum calculation logic, and multicast processing logic.

The data flow between both the TX and RX LCP engines 310 and 360 and the host 10 will now be described in detail. Both TX and RX LCP ports use memory buffers for transferring data and descriptor structures that point to such memory buffers. The descriptor structures are used to administer data buffers between a data provider and a data consumer and to return empty memory buffers to be used by the data provider. The descriptors point to the memory buffers based on either physical or virtual addresses.

TX LCP channels are responsible for data transfer from the host memory 60 into buffers of the ISOC 120. Other layers of logic are responsible for transferring data from buffers of the ISOC 120 into the network 30. RX LCP channels are responsible for transferring data received from the network 30 to the host memory 60.

The TX and RX LCP engines 310 and 360 are capable off handling a relatively large number of LCP channels. Each LCP channel has a set of parameters containing all information specific thereto. The information comprises the configuration of the channel, current state and status. The LCP context 140 associated with a channel is set by the LCP manager 130 during initialization of the channel. During channel operation, the content of the LCP context 140 is updated only by the ISOC 120. The LCP contexts 140 are saved in a context table within the memory subsystem 210 of the adapter 80. Access to the LCP context 140 of an LCP channel is performed according to the LCP number. The LCP RX and TX channels use different LCP context structures.

Data buffers are pinned areas in the memory 60 of the host 10. Transmit buffers hold data that for transmission. The TX LCP engine 310 moves the data located in these buffers into internal buffers of the ISOC 120. Incoming data received from the network 30 is moved by the RX LCP engine 360 into buffers in the memory 60 of the host 10. Ownership of the buffers alternates between software in the host 10 and the ISOC 120. The order of events on LCP TX channels is as follows:

A. Software in the host 10 prepares buffers with data to be transmitted in the memory 60 of the host 10;

B. The software notifies the ISOC 120 that data in the buffers is ready to be transmitted;

C. The ISOC 120 reads the data from the buffers; and,

D. The ISOC 120 identifies to the software in the host 10 the buffers that were read and can be reused by the software in the host 10 to transfer new data.

The order of events on LCP RX channels is as follows:

A. The software in the host 10 prepares buffers into which the ISOC 210 can write the received data;

B. The software notifies the ISOC 120 that free buffers are ready in the memory 60 of the host;

C. The ISOC 120 writes the data to the buffers; and,

D. The ISOC 120 identifies to the software in the host 10 the buffers that were filled with received data and can be processed by the software.

When the software prepares buffers to be used by the ISOC 120, buffer information is tracked via doorbell registers. Information relating to buffers used by the ISOC 120 is returned to the software using a status update or through a completion queue. For TX LCP channels, the buffers include data and header information transferred by the TX LCP engine 310 into the ISOC 120 and processed to become one or more packets for transmission on the network 30. The header is used by the TX processor 150 of the ISOC 120 to generate the header of the packet to be transmitted on the network 30. For RX LCP channels, free buffers are assigned by the software in the host 10 to the adapter 80. The adapter 80 fills the buffers with the received packets.

Figure 9A:
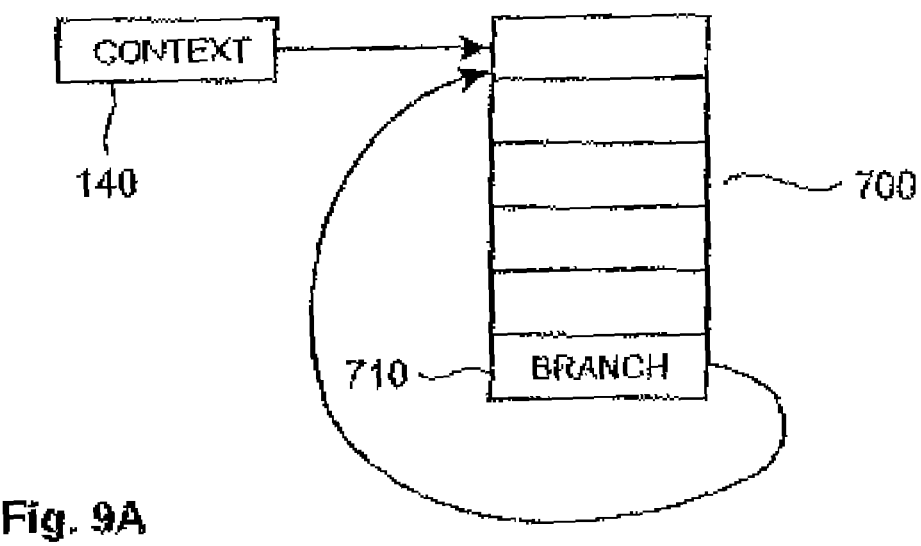
FIG. 9A is a block diagram of a cyclic descriptor table
Figure 9B:
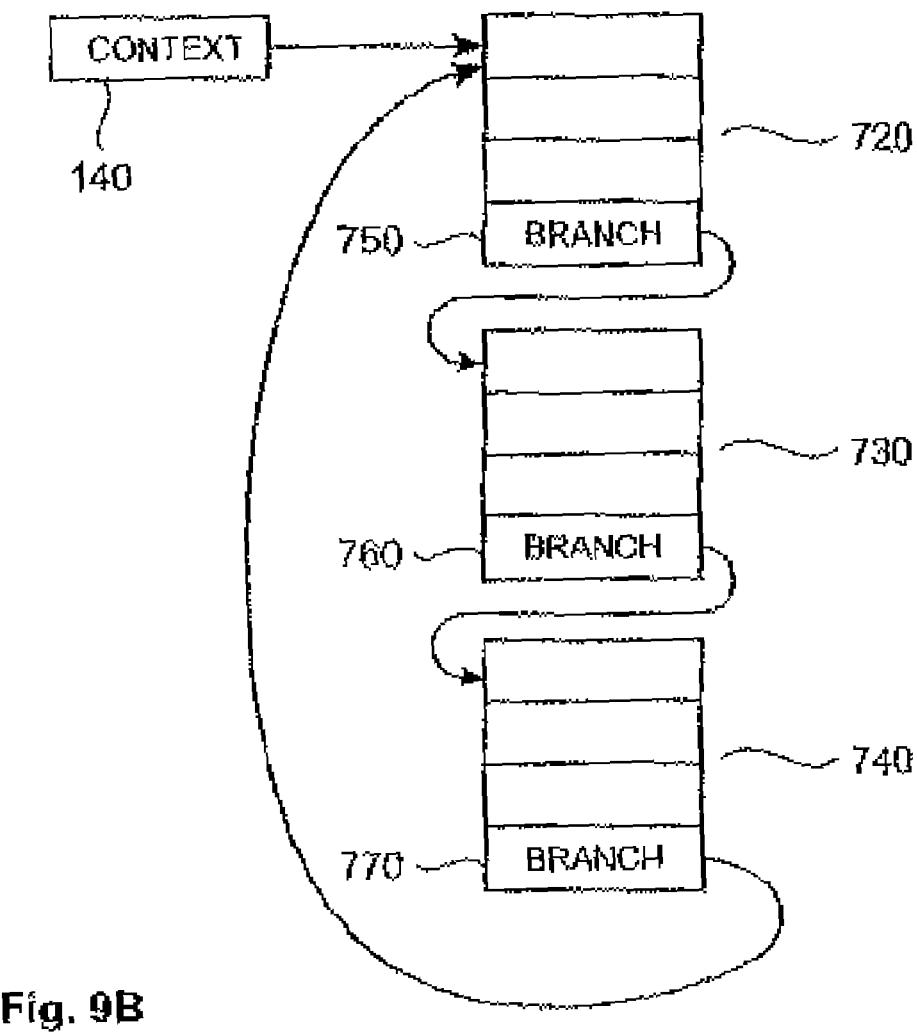
FIG. 9B is a block diagram of a linked set of descriptor tables.

The descriptors have defined data structures known to both the ISOC 120 and software in the host 10. The software uses descriptors to transfer control information to the ISOC 120. The control information may be in the form of a frame descriptor, a pointer descriptor, or a branch descriptor depending on desired function. Descriptor logic in the software and in the ISOC 120 generate and modify the descriptors according to control measures to be taken. Such measures will be described shortly. A frame descriptor comprises a description of the packet (e.g.: data length, header length, etc.). A pointer descriptor comprises a description of a data location. A branch descriptor comprises description of the descriptor location (e.g.: link lists of descriptors). Information in the descriptors is used for control by the software in the host 10 of the data movement operations performed by the TX and RX LCP engines 310 and 360. The information used to process a frame to generate a TX packet header is located in the header of the frame. Referring to FIG. 9A, descriptors may be provided in a single table 700 with the LCP context 140 pointing to the head of the table 700. Referring to FIG. 9B, descriptors may also be arranged in a structure of linked descriptor tables 720-740. Following LCP channel initialization, the LCP context 140 points to the head of the first descriptor table 720 in the structure. Branch descriptors 750-770 are used to generate a linked list of tables 720-740 where a branch descriptor 750-770 at the end of a descriptor table 720-740 points to the beginning of another table 720-0740. Referring back to FIG. 9A, branch descriptors can also be used to generate a cyclic buffer where a branch descriptor 710 at the end of a table 700 points to the beginning of the same table 700. A cyclic buffer may also be used in the receive path. In this case, the LCP 140 context is initiated to point to the head of the buffer. The buffer is wrapped around when the ISOC 120 reaches its end.

The software in the host 10 can write the descriptors into the memory 60 in the host 10 (for both the receive and the transmit paths) or into the memory 250 of the adapter 80 (for the transmit path only). Writing descriptors to the memory subsystem 210 of the adapter 80 involves an I/O operation by the software in the host 10 and occupies the memory subsystem 210 of the adapter 80. Writing descriptors in the memory 60 of the host 80 requires the adapter 80 to access the memory 60 of the host 10 whenever it has to read a new descriptor. The location of the software descriptors is defined by the LCP manager 130 for each LCP channel independently. The location of the descriptors is defined according to system performance optimization. The descriptors provide flexibility in the construction of queues.

The RX and TX LCP engines 310 and 360 use addresses to access the descriptors in the descriptor tables and to access data buffers. An address can be either a physical address or a virtual address. The term physical address describes an address that the ISOC 120 can drive, as is, to the bus 70. The term virtual address describes an address which is not a physical one and is used by the software or microcode. The virtual address has to pass through a mapping in order to generate the physical address. An address used by the TX and RX LCP engines 310 and 360 can have different sources as follows: pointer in the LCP channel context 140; pointer in descriptors prepared by software running on the host 10; pointer in descriptors prepared by the RX processor 160; and, pointer in descriptors prepared by the TX processor 150 (used for returning a completion message). A pointer can point to a descriptor or to a data buffer. Every address used by the TX and RX LCP engines 310 and 360 can be optionally mapped to a new address used as the physical address on the bus 70. The address mapping is done by the TX and RX LCP engines 310 and 360. The ISOC 120 uses local memory 210 to hold the translation tables. The LCP manager 130 writes the translation tables to the adapter 80 during memory registration. The address mapping allows virtual addressing to be used for buffers or descriptor tables. The virtual addressing enables the management of virtual buffers that are physically located in more than one physical page. The address mapping also allows the host 10 to work directly with applications using virtual addresses without requiring a translation processor for the software.

Figure 10:
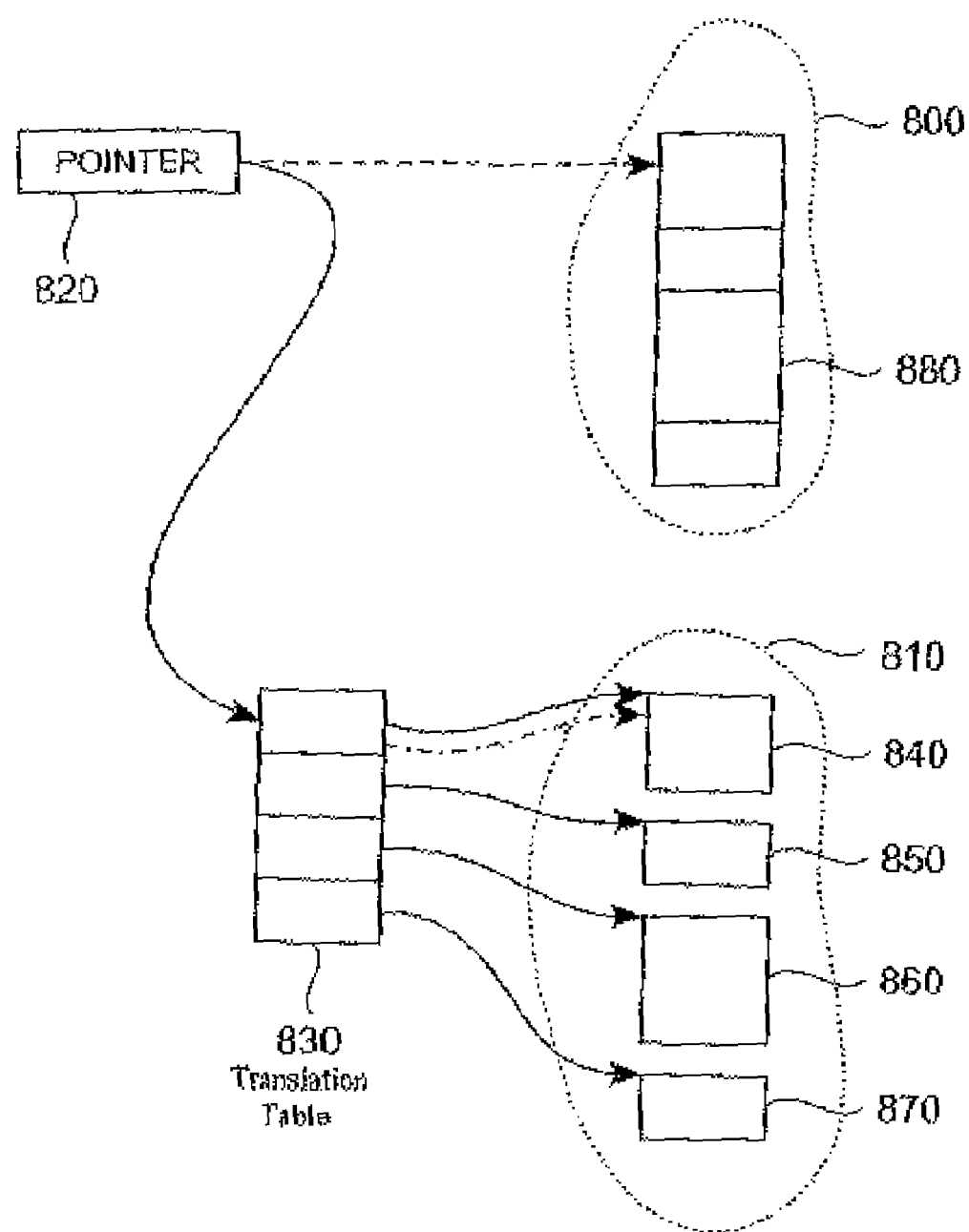
FIG. 10 is a block diagram of a virtual buffer and its physical counterpart buffer.

Referring to FIG. 10, shown therein is an image 800 of a buffer 880 as it appears to the software in the host 10. Also shown is a physical mapping 810 of the address at it is used to access the memory 60 in the host 10. A virtual pointer points 820 to a location in the buffer. The buffer in this example is a virtual buffer occupying a few noncontiguous pages 840-870 in the memory 60 of the host 10. The LCP engines 310 and 360 perform the mapping by translating the address via a translation table 830. The translation table holds a physical address pointer to the head of each physical buffer 840-870 mapped from the virtual buffer 880. Address mapping in the adapter 80 allows flexibility when mapping descriptors and data buffers in the memory 60 in the host 10.

Address mapping in the adapter 80 also allows a direct connection to software buffers that use virtual addresses without requiring the software in the host 10 to perform address translation to a physical address.

Each packet which the adapter 80 writes to the memory 60 in the host has a status associated therewith. The status allows synchronization between the adapter 80 and the software in the host 10. The status can be used to indicate different reliability levels of packets. The ISOC 120 provides the following status write backs: Transmit DMA Completion indicates that a data in a TX packet has been read into the adapter 80; Reliable Transmission is returned to indicate the completion of data transmission in the network 30; Receive DMA Completion indicates completion of a receive data transfer into the memory 60; and, Reliable Reception indicates reception of a transmit packet by a destination node in the network 30.

A TX frame descriptor includes a 2 byte status field. Status write back means that a transaction status is written back into a descriptor. The status includes a completion bit which can be polled by the software in the host 10. When the software in the host 10 finds a set completion bit, it may reuse the buffers associated with the frame defined by the frame descriptor.

Figure 11:
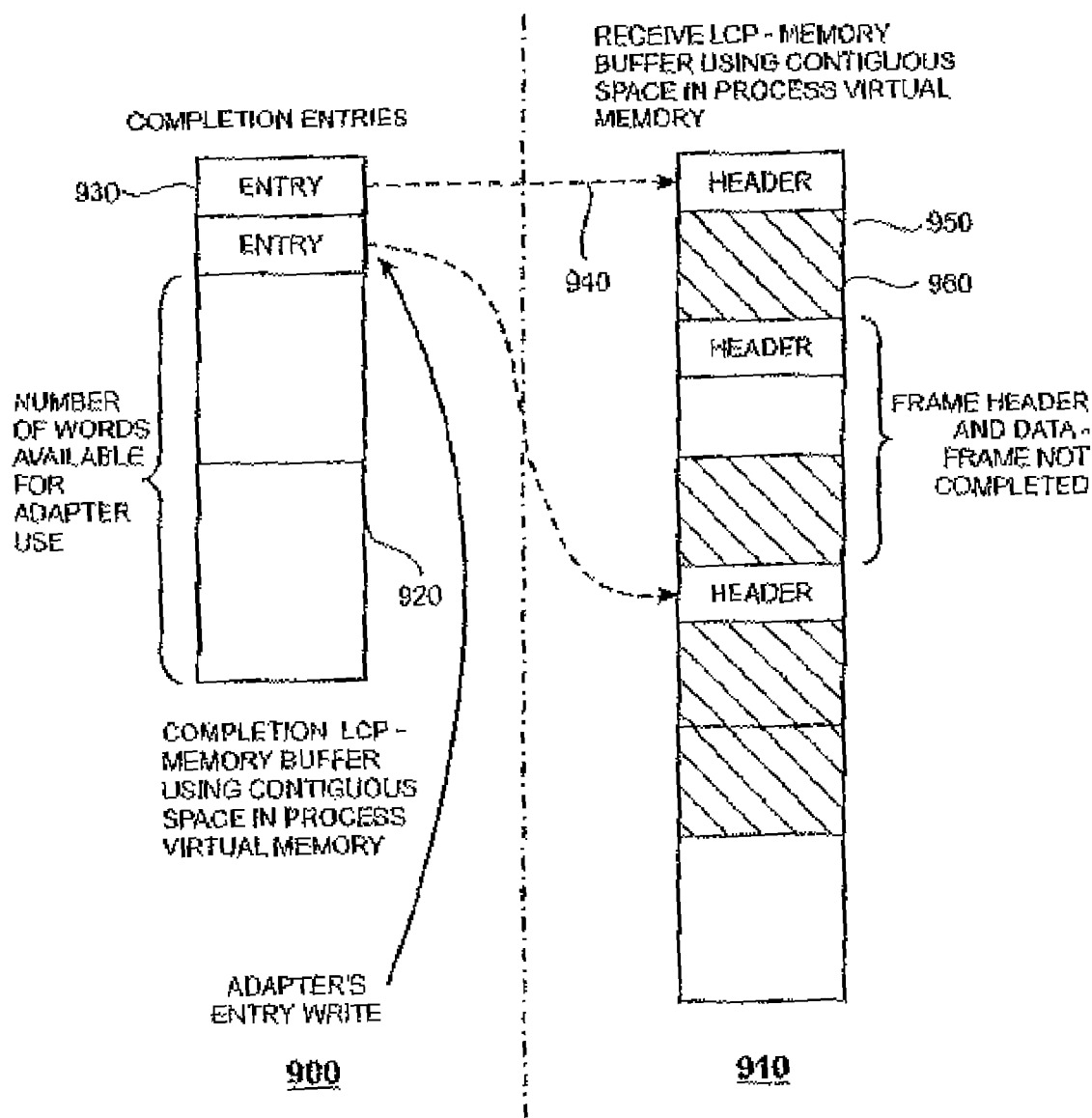
FIG. 11 is a block diagram of a completion queue.

A completion queue is implemented by an RX LCP channel. The LCP channel used by the completion queue has all the flexibility and properties that can be implemented by any RX LCP channel. The TX and RX processor 150 and 160 generates status write backs to indicate reliable transmission, reliable reception, receive DMA completion, or transmit DMA completion. Different indications relating to the frame are used in different cases. For example, in the case of a reliable transmission, the TX processor 150. Reads internal registers indicating the status of a packet transmission. In the case of reliable reception, the RX processor 160 gets a completion indication as a received packet which includes an acknowledgment. In the case of a receive DMA completion, the RX processor 160 uses frame completion information. In the case of a transmit DMA completion, the TX processor 150 indicates the reception of a frame for transmission in the adapter 80. A completion queue can be used by a single TX or RX LCP channel or may shared by multiple channels. Micro code in the adapter 80 updates a status queue by initiating a frame descriptor into a command queue of the RX LCP engine 360. Referring to FIG. 11, the status is transferred to the memory 60 of the host 10 via a completion status LCP 900 comprising a completion queue 920. The completion queue 900 is continuous (either physically or virtually) and is located in the memory 60 of the host 10. For example, the completion queue can be held in a continuous buffer. Entries 930 in the completion queue preferably have a fixed size. Each entry holds a pointer 940 to the head of a buffer 950 associated with a receive LCP 910. The buffer 950 is filled by the packet 960 associated with the completion status.

A TX software/adapter handshake comprises an TX LCP port and an completion RX LCP port. Each LCP transmit channel uses the following data structures:

A Doorbell entry, implemented as a memory mapped address, informs the adapter 80 of incremental requests to process descriptors and data. Each process has a unique access into a single page of memory mapped address used for Doorbell access.

An LCP context entry in the adapter memory space 210, containing LCP attributes and status fields.

A structure of transmit descriptors. This structure may span across multiple physical pages in the memory 60 of the host 10. If virtual addressing is used for the descriptors, a translation table is used to move one page to the next. If physical addressing is used for the descriptors, branch descriptors are used to move from one page to the next. Transmit descriptors contain a status field that can be updated following transfer of all descriptor related data to the adapter 80.

Transmit data buffers pinned in the memory 60 of the host 10 pointed to by the pointer descriptors. If virtual addressing is used for the data buffers, a translation tale converts the pointer into physical addresses used by the adapter 80 to access the memory 60 in the host 10.

A translation table and protection blocks in the adapter memory space 210 are used for address mapping.

Figure 12:
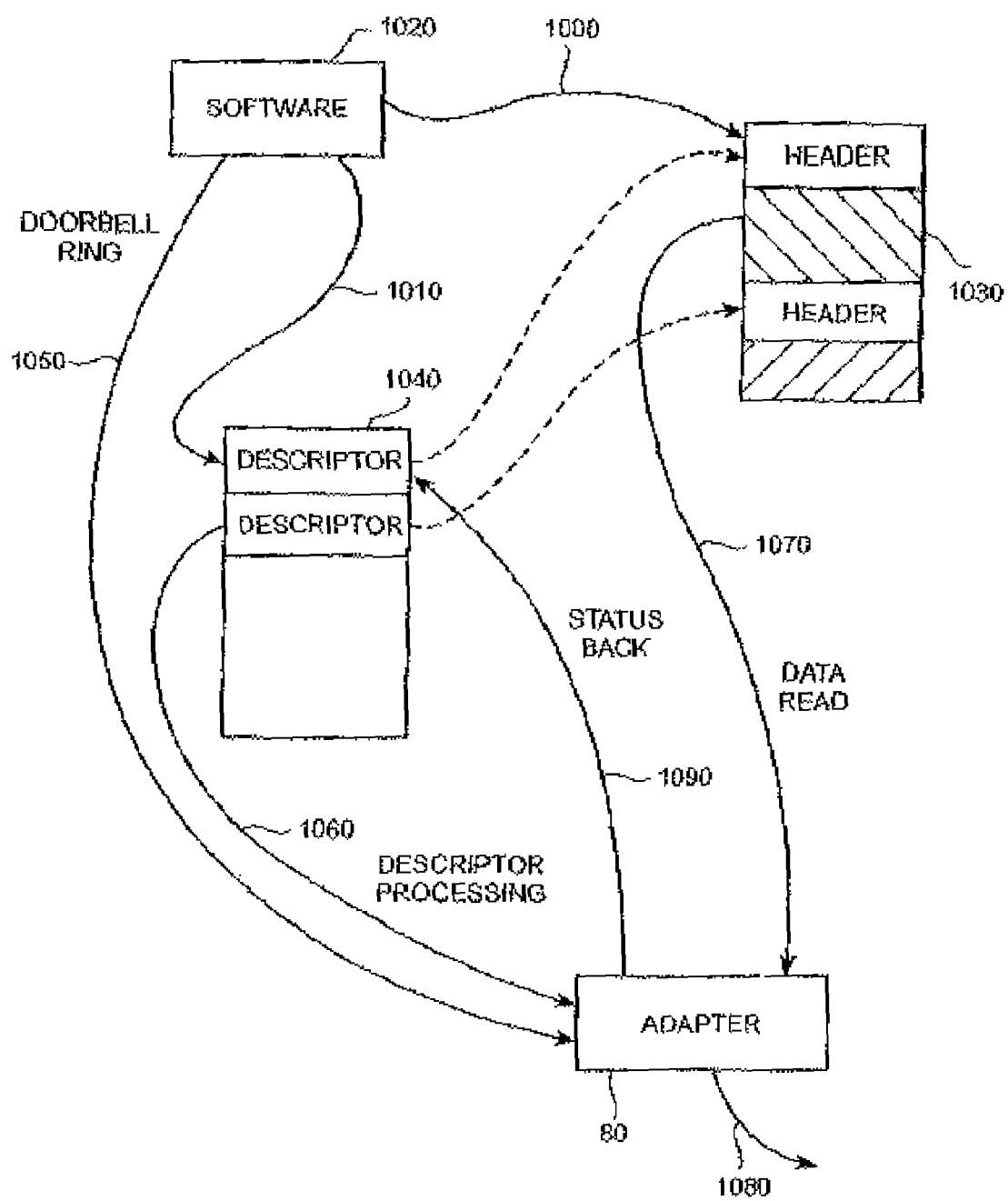
FIG. 12 is a block diagram of a transmit flow of data from the host to the network.

Referring to FIG. 12, a transmit packet flow comprises, at step 1000, software 1020 in the host 10 filling buffer 1030 with data to be transmitted. At step 1010, the software 1020 updates the descriptors 1040. The descriptors 1040 may be either in the memory 60 of the host 10 or in the memory subsystem 210 of the adapter 80. At step 1050, the software 1020 rings the Doorbell to notify the adapter 80 that new data is ready to be transmitted. At step 1060, the adapter 80 manages arbitration between requests from the different LCP channels. When a channel wins the arbitration, the adapter 80 reads the new descriptors 1040. At step 1070, the adapter 80 reads the data. At step 1080, the data is transmitted to the network 30. At step 1090, the status is updated in the descriptors 1040 or in the completion queue.

The TX LCP channel may use address translation when accessing data buffers. In this case, the data buffer is composed of multiple memory pages. As far as the process is concerned, these memory pages are in consecutive virtual memory space. However, as far as the adapter 80 is concerned, these memory pages may be in nonconsecutive physical memory space. A completion status structure contains information indicative of the status of transmitted frames. This is implemented as a separate LCP channel. The frame descriptor, which is the first descriptor for every fame, has an optional status field which can be updated after the frame has been transferred to the adapter 80.

Figure 13:
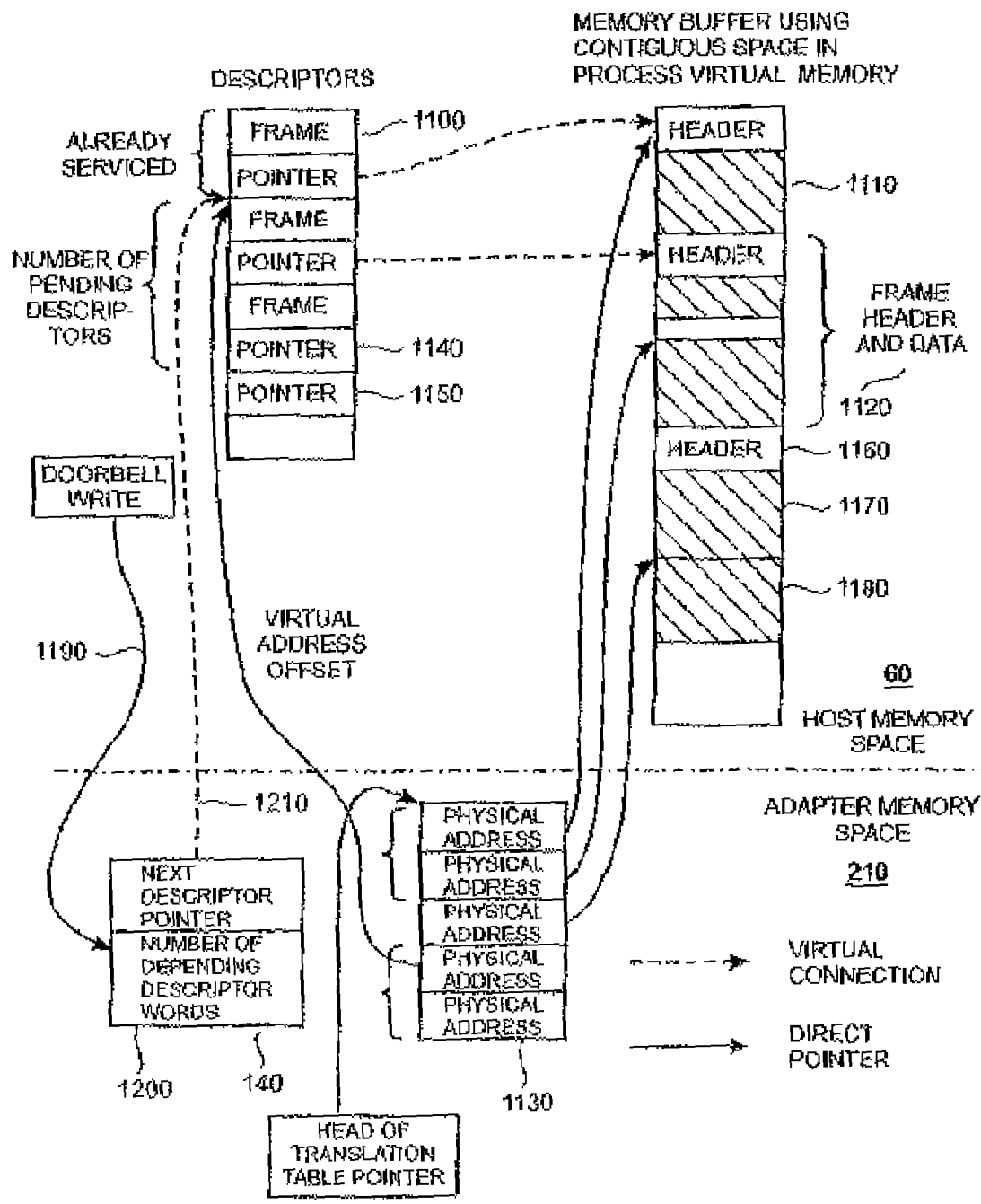
FIG. 13 is another block diagram of a transmit flow of data from the host to the network.

Referring now to FIG. 13, in an example of a transmit LCP channel flow, descriptors 1100 are located in the memory 60 of the host 10. Access to the descriptors 1110 and buffers 1110 storing packets 1120 requires address translation through a translation table 1130 located in the adapter 80. The buffers 1110 use contiguous space in the virtual address space of the software in the host 10. Each frame 1120 is described by two types of descriptors: a frame descriptor 1140 giving information relating the packet; and, a pointer descriptor 1150 pointing to the buffer 1110 holding the data 1120. Each packet comprises a data payload 1170 preceded by a header 1160 in the same buffer 1180.

A write transaction 1190 to the Doorbell updates the number of words 1200 available for use by the adapter 80. This information is stored in the LCP context 140. The transmit LCP context 140 includes a pointer 1210 to the head of the buffer 1110 holding the data to be transmitted. When the LCP channel wins the internal channel arbitration of the ISOC 120, the ISOC 120 reads the descriptors of the LCP channel according to the pointer 1210 in the LCP context 140. Virtual addresses, for both descriptors 1100 and buffers 1110 of the LCP channel, are translated into physical addresses using the translation table 1130 located in the memory subsystem 210 of the adapter 80. The translation table 1130 is updated by the LCP manager 140 during registration of the memory buffers. The ISOC 120 reads the data and frame headers from the buffers 1110 into the adapter 80. The frame headers 1160 are then replaced on the ISOC 1320 by a header for the network 30. The packet header and the corresponding data are then transmitted to the network 30.

The RX LCP port is used to transfer incoming data from the ISOC 120 to the memory 60 used by a software application running on the host 10. TX LCP channels are completely controlled through descriptors initiated by the software on the host 10. RX LCP channels use descriptors from both the software on the host 10 and the ISOC 120. The descriptors initiated by the ISOC 120 are used to control the LCP channel operation to define the destination of a received frame in the memory 60 of the host 10. The descriptors initiated by the software in the host 10 can be used to define the location of buffers where the buffers were not defined through mapping in a translation table. To implement a handshake between the software in the host 10 and the adapter 80, two LCP channels are preferably used: an RX LCP channel for handling the received incoming data structure; and, an RX LCP channel for handling the completion status queue. The completion status is used by the adapter 80 to signal to the software in the host 10 that a frame transfer into the memory 60 of the host 10 is completed. Entries are inserted into the completion queue structure in sequential addresses. Each completion status entry contains a field that is marked by the adapter 80 and pooled by the software in the host 10 to check that the entry ownership has been transferred from the adapter 80 to the software in the host 10. One or more RX LCP channels can use the same completion status queue. The sharing of the completion status queue by multiple RX LCP channels is performed by the ISOC 120.

An RX LCP channel requires information to indicate the destination address for an incoming packet. The ISOC 120 has two addressing for finding the location of free buffers:

Direct addressing mode refers to LCP channels that do not use pointer descriptors to point out a buffer. The destination address is defined either by microcode in the ISOC 120 or read from the context 140.

Indirect addressing mode refers to LCP channels that maintain pointers to data buffers in descriptor structures. The descriptors are preferably located in the memory 60 of the host 10.

Direct addressing substantially cuts down the latency of processing an incoming packet through the adapter 80. However, it requires registration of memory buffer by the LCP manager 130, including storage of virtual to physical translation information on the adapter 80. The software in the host 10 writes to the channels Doorbell to indicate the amount of words added to the free buffer that can be used by the channel. In direct mode, the following steps are used to determine the address of the destination buffer:

A. Address A is driven as a command to the LCP engine.
B. (Optional) Address A is mapped to address A'.
C. Address A' (if step B is executed) or A (if step B is not executed) is the base address for the destination buffer.

In indirect mode, the adapter 80 uses descriptors to find the address of the data buffers. The descriptors are managed by the software in the host 10. The descriptors are preferably located in the memory 60 of the host 10. The term indirect is used to emphasize that the adapter 80 reads additional information to define the destination address. The adapter 80 accesses this information during run-time. Indirect addressing cuts down the amount of the memory n the adapter 80 required to store translation tables. The descriptors are typically located in the memory 60 of the host 10. In indirect mode, the following steps are used to determine the address of the destination buffer:

A. Address A is driven as a command to the LCP engine.
B. (Optional) Address A is mapped to address A'.
C Address A' (if step B is executed) or A (if step B is not executed) is the address of the pointer descriptor.
D. The pointer to the buffer, address B, is read from the descriptor.
E. (Optional) Address B is mapped to address B'.
F. Address B' (if step E is executed) or B (if step E is not executed) is the base address for the destination buffer.

Each RX LCP channel uses the following data structures:

Access to the Doorbell, implemented as a memory mapped address, informs the adapter 80 of additional data or descriptors available for the adapter 80 to write packet data.

An LCP context entry in the memory space 210 of the adapter 80 contains LCP attributes, state, configuration, and status fields.

Descriptors pointing to memory buffers for use in indirect mode.

A buffer in contiguous virtual address space in the memory 60 of the host 10.

A translation table and protection blocks in the memory space 210 of the adapter 80 for address mapping.

The flow of receiving a packet depends on the following characteristics:

Direct or indirect addressing mode.

For indirect mode, descriptors are located in the memory 60 of the host 10.

For direct mode, address mapping may or may not be used during access to descriptors.

Address mapping may or may not be used during access to buffers.

For indirect mode, address protection may or may not be used during access to descriptors.

Address protection may or may not be used during access to buffers.

These characteristics are set for each LCP channel as part of the channel's context 140 during the LCP channel initialization.

Figure 14:
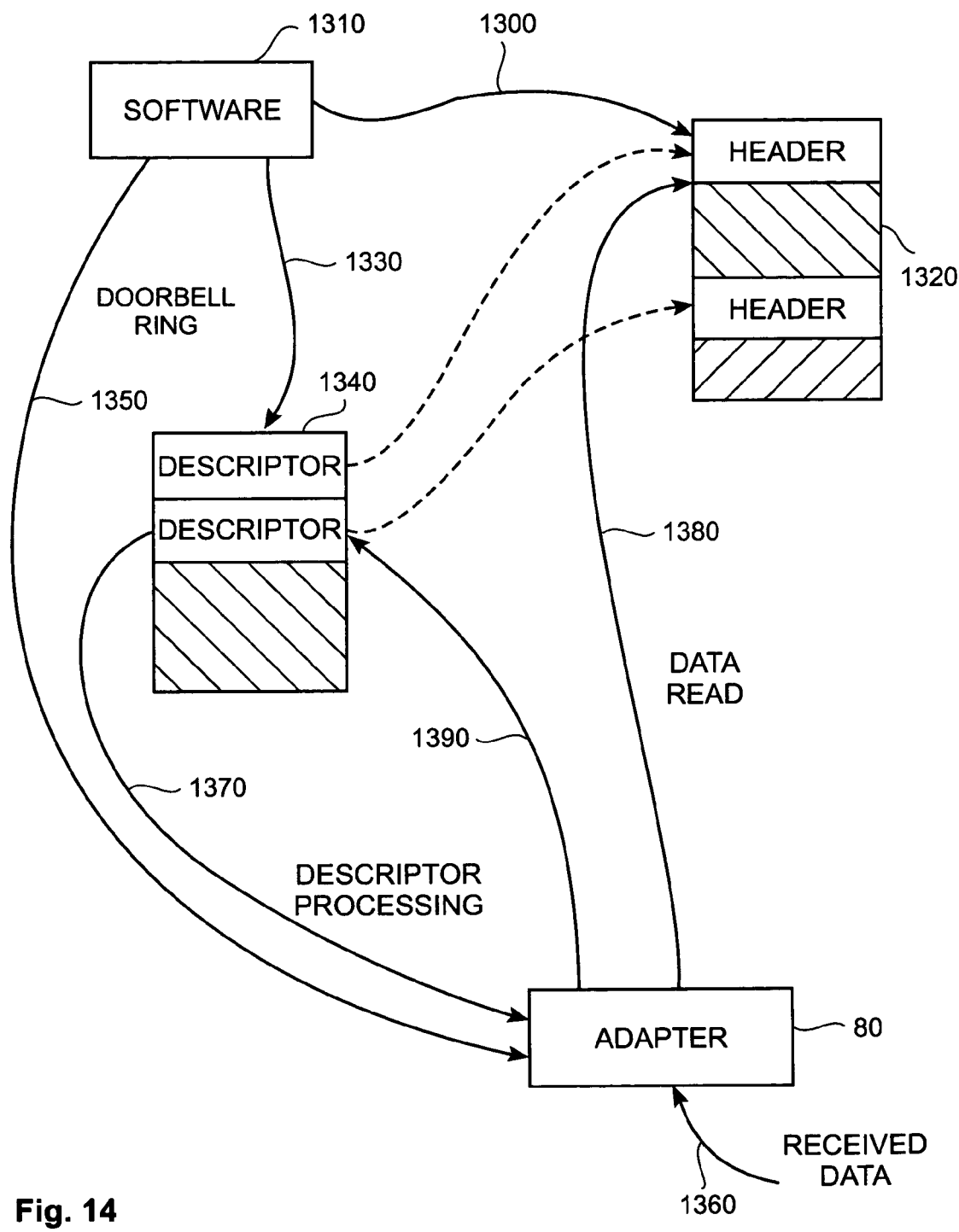
FIG. 14 is a block diagram of a receive flow of data from the network to the host.

Referring to FIG. 14, a flow of receive packets comprises, at step 1300, preparation by software 1310 in the host 10 of free buffer 1320 for the received data. At step 1330, in indirect mode, the software 1310 in the host 10 updates the descriptors 1340. The descriptors 1340 are located in the memory 60 of the host 10. At step 1350, the software in the host 10 rings the Doorbell to notify the adapter 80 of the free buffer space. For indirect mode, the Doorbell provides information indicative of the new descriptors 1340. For direct mode, the Doorbell provides information indicative of added free buffer space. At this stage, the adapter 80 is ready to transfer receive data from the network 30 to the memory 60 of the host 10. Steps 1300, 1330, and 1350 are repeated whenever the software 1310 in the host 10 adds free buffers 1320 to the RX LCP channel. The ISOC 120 repeats the following steps for each received packet. At step 1360, the adapter 80 receive the data. At step 1370, in indirect mode, the adapter 80 reads descriptors 1340 pointing to the location of the free data buffers 1320. At step 1380, data and headers are written into the data buffers 1340. At step 1390, status is updated in the completion queue.

Figure 15:
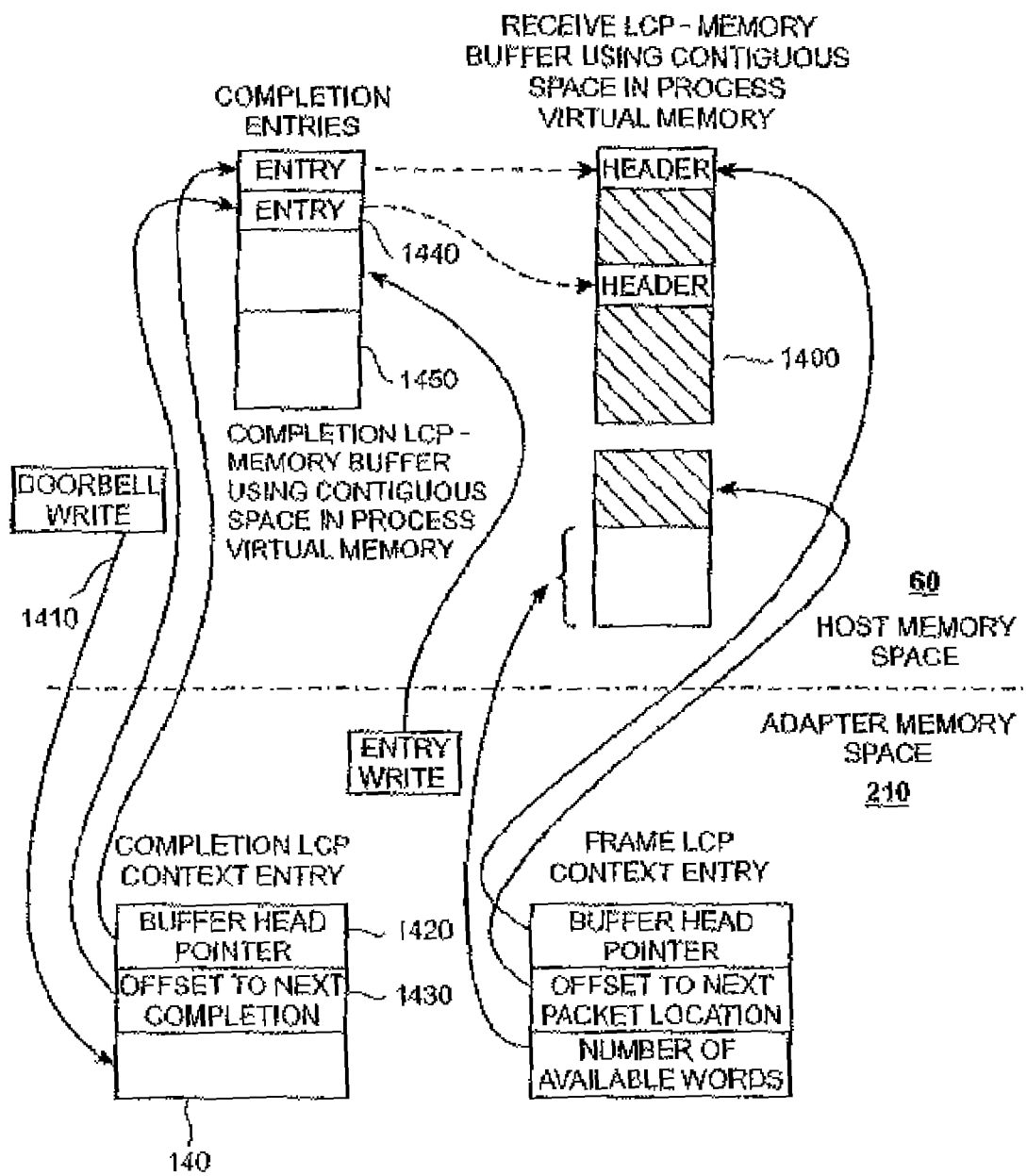
FIG. 15 is another block diagram of a receive flow of data from the network to the host.

Referring to FIG. 15, in an example of a receive LCP channel flow, pointer descriptors are not used. Furthermore, no translation tables are used. Data buffers 1400 use contiguous space in the physical address space of software in the host 10 using the buffers 1400. Both header and data payload are written to the buffers 1400. A write transaction 1410 to the Doorbell updates the data space available for use by the adapter 80. The information is stored in the LCP context 140. The receive/completion LCP context 140 includes a pointer 1420 to the head of the buffer 1400 and an offset 1430 to the next/current address used to write new data/completion entries. When the adapter 980 receives a packet, it increments the offset 1430 to the next packet location and updates the available data space. A completion entry 1440 is added to a completion LCP 1450 upon completion of a frame reception, upon frame time-out, or for any other frame event that requires awareness from the LCP client 100. The completion entry 1440 contains all the information needed by the LCP client 100 to locate the frame within the LCP data buffer 1400. The software in the host 10 uses a field within the completion entry 1440 to recognize that it has been granted ownership of the completion entry 1440.

The ISOC 120 allows LCP channels to be used for moving data between the memory subsystem 210 of the adapter 80 and the memory 60 of the host 10. To transfer data from the memory 60 of the host 10 to the adapter 80 a transmit channel is used. To transfer data from the adapter 80 to the memory 60 of the host 10 a receive channel is used. When data is to be transferred from the memory 60 of the host 10 to the adapter 80 a frame descriptor includes a destination address on the bus 340 of the ISOC 120. This address defines the destination of the frame data payload. The packet header is transferred in the usual manner. This allows loading of tables and code into the memory space of the ISOC 120. To transfer data from the memory space of the ISOC 120 to the memory 60 of the host 10 using a receive channel a descriptor is initiated by the RX processor 160. The descriptor include information indicative of both destination address in the memory 60 of the host 10 and source address.

In preferred embodiments of the present invention hereinbefore described, the adapter 80 is connected to the CPU 50 and memory 60 of the host computer system 10 via the bus architecture 70. However, in other embodiments of the present invention, the adapter 80 may be integrated into the host computer system 10 independently of the bus architecture 70. For example, in other embodiment of the present invention, the adapter 80 may be integrated into the host computer system via a memory controller connected to the host memory 60.

Additionally, in preferred embodiments of the present invention hereinbefore described, the adapter 80 was implemented in the form of a pluggable adapter card for insertion into the host computer system 10. It will however be appreciated that different implementation of the adapter 80 are possible in other embodiments of the present invention. For example, the adapter 80 may be located on a mother board of the host computer system, along with the CPU 50 and the memory 60.

Variations described for the present invention can be realized in any combination desirable for each particular application. Thus particular limitations, and/or embodiment enhancements described herein, which may have particular advantages to a particular application need not be used for all applications. Also, not all limitations need be implemented in methods, systems and/or apparatus including one or more concepts of the present invention.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

We claim:

1. An apparatus comprising:
   descriptor logic on a tangible computer readable medium, said apparatus comprising hardware for controlling flow of data between first and second data processing systems via a memory, said descriptor logic for generating a plurality of descriptors including a frame descriptor defining a data packet to be communicated between a location in the memory and the second data processing system,
   a pointer descriptor identifying the location in the memory; and
   a descriptor table for storing on the computer readable medium, the plurality of descriptors generated by the descriptor logic for access by the first and second data processing systems,
   wherein said apparatus employs Logical Communication Port architecture;
   wherein said Logical Communication Port architecture comprises LCP Clients, an LCP Manager resident in the kernel space, and at least one LCP Context resident in an adapter; and
   wherein an LCP client can be located in one of user application space and the kernel.

2. An apparatus as claimed in claim 1, wherein the descriptor table is stored in one of the first data processing system and the second data processing system.

3. An apparatus as claimed in claim 1, wherein the descriptor table is stored in the second data processing system.

4. An apparatus as claimed in claim 1, wherein the descriptor logic generates a branch descriptor comprising a link to another descriptor in the descriptor table.

5. An apparatus as claimed in claim 4, wherein the descriptor table comprises a plurality of descriptor lists sequentially linked together via branch descriptors therein.

6. An apparatus as claimed in claim 4, wherein the descriptor table comprises a cyclic descriptor list.

7. An apparatus as claimed in claim 1, wherein the first data processing system comprises a host computer system.

8. An apparatus as claimed in claim 1, wherein the second data processing system comprises a data communications interface for communicating data between the host computer system and a data communications network.

9. A data processor comprising:
   a host computer system having a memory, a data communications interface for communicating data between the host computer system and a data communications network, and apparatus comprising:
   descriptor logic on a computer readable medium, said apparatus for controlling flow of data between first and second data processing systems via a memory, said descriptor logic for generating a plurality of descriptors including a frame descriptor defining a data packet to be communicated between a location in the memory and the second data processing system, and
   a pointer descriptor identifying the location in the memory; and
   a descriptor table for storing on the computer readable medium, the plurality of descriptors generated by the descriptor logic for access by the first and second data processing systems, for controlling flow of data between the memory of the host computer system and the data communications interface, and wherein said data processor employs Logical Communication Port architecture; wherein said Logical Communication Port architecture comprises LCP Clients, an LCP Manager resident in the kernel space, and at least one LCP Context resident in an adapter; and wherein an LCP client can be located in one of user application space and the kernel.

10. A method comprising controlling flow of data between first and second data processing systems via a memory, the step of controlling comprising:
   by descriptor logic, generating a plurality of descriptors including a frame descriptor defining a data packet to be communicated between a location in the memory and the second data processing system,
   a pointer descriptor identifying the location in the memory; and
   storing the descriptors generated by the descriptor logic in a descriptor table for access by the first and second data processing systems, wherein said data processing systems employ Logical Communication Port architecture;

wherein said Logical Communication Port architecture comprises LCP Clients, an LCP Manager resident in the kernel space, and at least one LCP Context resident in an adapter; and wherein an LCP client can be located in one of user application space and the kernel.

11. A method as claimed in claim 10, comprising storing the descriptor table in the first data processing system.5

12. A method as claimed in claim 10, comprising storing the descriptor table in the second data processing system.

13. A method as claimed in claim 10, comprising, by the descriptor logic, generating a branch descriptor comprising a link to another descriptor in the descriptor table.

14. A method as claimed in claim 13, comprising linking a plurality of descriptor lists together in series via branch descriptors to form the descriptor table.

15. A method as claimed in claim 10, wherein the first data processing system comprises a host computer system.

16. A method as claimed of claim 10, wherein the second data processing system comprises a data communications interface for communicating data between the host computer system and a data communications network.

17. A computer program product comprising a computer readable medium having computer readable program code means embodied therein for causing control of flow of data between first and second data processing systems, the computer readable program code means in said computer program product comprising code for causing a computer to effect the functions of claim 1.

18. A computer program product comprising a computer readable medium having computer readable program code means embodied therein for causing data processing, the computer readable program code means in said computer program product comprising code for causing a computer to effect the functions of a data processing system, the data processing system comprising:

a host processing system having a memory, a data communications interface for communicating data between the host computer system and a data communications network, and apparatus comprising:

descriptor logic, said apparatus for controlling flow of data between first and second data processing systems via a memory, said descriptor logic for generating a plurality of descriptors including a frame descriptor defining a data packet to be communicated between a location in the memory and the second data processing system, and a pointer descriptor identifying the location in the memory; and a descriptor table for storing the descriptors generated by the descriptor logic for access by the first and second data processing systems, for controlling flow of data between the memory of the host computer system and the data communications interface, wherein said data processing systems employ Logical Communication Port architecture;

wherein said Logical Communication Port architecture comprises LCP Clients, an LCP Manager resident in the kernel space, and at least one LCP Context resident in an adapter; and wherein an LCP client can be located in user application space or in the kernel.

19. An article of manufacture comprising a computer readable medium having computer readable program code means embodied therein for causing control of flow of data between first and second data processing systems, the computer readable program code means in said article of manufacture comprising code for causing a computer to effect the steps of a method controlling flow of data between first and second data processing systems via a memory, the step of controlling comprising:

by descriptor logic, generating a plurality of descriptors including a frame descriptor defining a data packet to be communicated between a location in the memory and the second data processing system, a pointer descriptor identifying the location in the memory; and storing the descriptors generated by the descriptor logic in a descriptor table for access by the first and second data processing systems, wherein said data processing systems employ Logical Communication Port architecture;

wherein said Logical Communication Port architecture comprises LCP Clients, an LCP Manager resident in the kernel space, and at least one LCP Context resident in an adapter; and wherein an LCP client can be located in one of user application space or in the kernel.

20. A program storage device readable by machine, tangibly embodying a program of instructions executable by the machine to perform method steps for controlling flow of data between first and second data processing systems, said method comprising controlling flow of data between first and second data processing systems via a memory, the step of controlling comprising:

by descriptor logic, generating a plurality of descriptors including a frame descriptor defining a data packet to be communicated between a location in the memory and the second data processing system, a pointer descriptor identifying the location in the memory; and storing the descriptors generated by the descriptor logic in a descriptor table for access by the first and second data processing systems, wherein said data processing systems employ Logical Communication Port architecture;

wherein said Logical Communication Port architecture comprises LCP Clients, an LCP Manager resident in the kernel space, and at least one LCP Context resident in an adapter; and wherein an LCP client can be located in user application space or in the kernel.

21. An apparatus as claimed in claim 1, wherein:

the descriptor table is stored in one of the first data processing system and the second data processing system;

the descriptor table is stored in the second data processing system;

the descriptor logic generates a branch descriptor comprising a link to another descriptor in the descriptor table;

the descriptor table comprises a plurality of descriptor lists sequentially linked together via branch descriptors therein; and the descriptor table comprises a cyclic descriptor list.

* * * * *